United States Patent
Hill

(10) Patent No.: US 8,751,833 B2
(45) Date of Patent: Jun. 10, 2014

(54) DATA PROCESSING SYSTEM

(75) Inventor: Stephen John Hill, Cambridge (GB)

(73) Assignee: ARM Limited, Cambridge (GB)

( * ) Notice: Subject to any disclaimer, the term of this patent is extended or adjusted under 35 U.S.C. 154(b) by 906 days.

(21) Appl. No.: 12/662,743

(22) Filed: Apr. 30, 2010

(65) Prior Publication Data

US 2011/0271126 A1 Nov. 3, 2011

(51) Int. Cl.
*G06F 1/32* (2006.01)
*G06F 9/30* (2006.01)
*G06F 15/76* (2006.01)
*G06F 13/14* (2006.01)

(52) U.S. Cl.
USPC ........... 713/300; 713/310; 713/320; 713/323; 713/324; 713/340; 712/220; 712/228; 711/130; 711/147

(58) Field of Classification Search
USPC ................. 713/300, 310, 320–324, 330, 340; 710/1; 711/130.147; 712/1, 203, 220, 712/225, 228
See application file for complete search history.

(56) References Cited

U.S. PATENT DOCUMENTS

| | | | |
|---|---|---|---|
| 5,913,068 A | 6/1999 | Matoba | |
| 6,263,405 B1 | 7/2001 | Irie et al. | |
| 6,374,362 B1 * | 4/2002 | Ohtsu | 714/4.1 |
| 6,501,999 B1 | 12/2002 | Cai | |
| 6,631,474 B1 | 10/2003 | Cai et al. | |
| 7,275,124 B2 | 9/2007 | Ogilvie et al. | |
| 7,461,275 B2 | 12/2008 | Belmont et al. | |
| 7,996,663 B2 | 8/2011 | Stillwell et al. | |
| 2002/0095609 A1 | 7/2002 | Tokunaga | |
| 2004/0003309 A1 * | 1/2004 | Cai et al. | 713/320 |
| 2005/0132239 A1 | 6/2005 | Athas et al. | |
| 2005/0166039 A1 * | 7/2005 | Wang et al. | 712/227 |
| 2006/0064606 A1 | 3/2006 | Kim et al. | |
| 2007/0079150 A1 | 4/2007 | Belmont et al. | |
| 2008/0288748 A1 | 11/2008 | Sutardja et al. | |
| 2009/0024799 A1 | 1/2009 | Jahagirdar et al. | |
| 2009/0172369 A1 * | 7/2009 | Stillwell et al. | 712/228 |
| 2010/0287394 A1 | 11/2010 | Branover et al. | |
| 2011/0161586 A1 * | 6/2011 | Potkonjak et al. | 711/122 |
| 2011/0213947 A1 | 9/2011 | Mathieson et al. | |

FOREIGN PATENT DOCUMENTS

WO WO 2004/102376 11/2004
WO WO 2005/062180 7/2005

OTHER PUBLICATIONS

Office Action mailed Dec. 21, 2012 in co-pending U.S. Appl. No. 12/659,235.
International Search Report mailed Apr. 27, 2011 in PCT/GB2011/050376.

(Continued)

*Primary Examiner* — Fahmida Rahman
(74) *Attorney, Agent, or Firm* — Nixon & Vanderhye P.C.

(57) ABSTRACT

A data processing apparatus is provided comprising first processing circuitry, second processing circuitry and shared processing circuitry. The first processing circuitry and second processing circuitry are configured to operate in different first and second power domains respectively and the shared processing circuitry is configured to operate in a shared power domain. The data processing apparatus forms a uni-processing environment for executing a single instruction stream in which either the first processing circuitry and the shared processing circuitry operate together to execute the instruction stream or the second processing circuitry and the shared processing circuitry operate together to execute the single instruction stream. Execution flow transfer circuitry is provided for transferring at least one bit of processing-state restoration information between the two hybrid processing units.

35 Claims, 12 Drawing Sheets

(56) References Cited

OTHER PUBLICATIONS

International Search Report and Written opinion of the International Searching Authority mailed Jul. 25, 2011 in PCT/GB2011/050319.
International Search Report and Written opinion of the International Searching Authority mailed Jul. 25, 2011 in PCT/GB2011/050315.
International Search Report and Written opinion of the International Searching Authority mailed Jul. 25, 2011 in PCT/GB2011/050317.
Office Action mailed Jan. 30, 2013 in co-pending U.S. Appl. No. 12/659,230.
Office Action mailed Jun. 27, 2012 in co-pending U.S. Appl. No. 12/659,230.
Office Action mailed Jun. 4, 2012 in co-pending U.S. Appl. No. 12/659,234.
International Preliminary Report on Patentability mailed Jun. 25, 2012 in PCT/GB2011/050315.
International Preliminary Report on Patentability dated Oct. 5, 2012 in PCT/GB2011/050376.
Kumar et al., "Single-ISA Heterogeneous Multi-Core Architectures: The Potential for Processor Power Reduction", Proceedings of the 36$^{th}$ International Symposium, *IEEE Computer Society*, 2003, 12 pgs.
Kumar et al., "Towards Better Performance Per Watt in Virtual Environments on Asymmetric Single-ISA Multi-core Systems", (No Date), pp. 105-109.
Kumar et al., "Conjoined-core Chip Multiprocessing", Proceedings of the 37$^{th}$ International Symposium, Dec. 2004, pp. 1-12.
Becchi et al., "Dynamic Thread Assignment on Heterogeneous Multiprocessor Architectures", *CF'06*, May 2006, pp. 29-39.
U.S. Appl. No. 12/659,234, filed Mar. 1, 2010, Greenhalgh et al.
U.S. Appl. No. 12/659,235, filed Mar. 1, 2010, Greenhalgh et al.
U.S. Appl. No. 12/659,230, filed Mar. 1, 2010, Greenhalgh et al.

\* cited by examiner

DATA PROCESSING SYSTEM

This application claims priority to U.S. application Ser. No. 12/659,230, filed 1 Mar. 2010; Ser. No. 12/659,234, filed 1 Mar. 2010; and Ser. No. 12/659,235 filed 1 Mar. 2010, the entire contents of each of which are hereby incorporated by reference.

BACKGROUND OF THE INVENTION

1. Field of the Invention

The present invention relates to a data processing system.

2. Description of the Prior Art

Management of power consumption is a major design goal for designers of system-on-chip integrated circuits and data processing apparatuses in general. With the increased prevalence of portable data processing devices such as portable telephones, personal organisers and personal computers, careful control of power consumption is becoming more of a key factor in system design. Even in non-portable data processing devices, reduction of power dissipation and power consumption is important because it reduces the running costs, simplifies the design of cooling and power supplies and increases the reliability of operation.

There is a need for different power-performance modes of data processing devices because many power-constrained applications of processors require relatively low processor performance for the majority of the run time of the device but sometimes require considerably higher performance for relatively short periods of processing time. Data processing devices are likely to incorporate several and perhaps even tens of processors to implement a number of different processing tasks and any processors that are unused, even temporarily, during operation of the data processing device may well have both (a) a high-performance high-power consumption mode; and (b) one or more lower-performance lower-power consumption modes. This allows for the performance of the processor to be tailored to the demands of the current processing workload (i.e. operating system and one or more program applications) thus saving power when maximum processing performance is not required.

Processor power dissipation is often divided into dynamic (or switching) power and a static (or leakage) power component. The dynamic power component is associated with electrical signals changing voltage levels. In processor designs that use a typical clocked complementary metal-oxide semiconductor (CMOS) circuit, the dynamic power is consumed when circuits are clocked or inputs change logic levels. By way of contrast, static power is consumed for the entire duration of time that power is supplied to the processing circuitry.

It is known to control power and performance of a data processing apparatus by using dynamic voltage and frequency scaling (DVFS). In the DVFS approach low energy consumption modes are entered by reducing the voltage supply to the processing circuits so that they use less power. This reduction in voltage also makes the transistors of the processing circuitry switch more slowly, which in turn means that the frequency of the processor clock should necessarily be reduced corresponding to the reduction in voltage. A simple DVFS processing device will typically have a full-voltage and full-performance point and at least one lower voltage lower performance point.

One problem with power management using DVFS is that it requires relatively complex power supply and clocking systems and this can increase the complexity of processor designs where the processing circuitry is voltage-frequency scaled but external circuitry is not or is voltage-frequency scaled by a different amount.

DVFS power management also has a limit to the lowest power point that it can provide in a data processing system. This is because transistors of the processing circuitry cannot operate below a certain characteristic minimum voltage for a given fabrication technology. This means that large high performance processors cannot be voltage-frequency scaled down to an arbitrarily low performance-power point. Furthermore, voltage scaling typically does not eliminate static power consumption. Large high performance processors that are required for the more demanding processing applications typically comprise large numbers of transistors and correspondingly have large static power consumption. Thus, it is desirable to provide a data processing system that provides performance scaling in a manner that enables high-performance processing to be achieved yet provides a lower more efficient power point at the lower performance end of the scale, and which has a simplified power supply and clocking circuitry.

It is also known to provide data processing systems having heterogeneous multiprocessors. Such heterogeneous multiprocessors are made up of at least two processors of different types, for example, one high-performance high-power processor and at least one lower performance lower power processor. Such multiprocessor systems are designed to be capable of concurrently executing two or more separate instruction streams corresponding to the individual number of processors making up the multiprocessor. Each processor's instruction stream contains instructions from the process it is currently running and when running at full performance, multiprocessor systems will typically have all of the high performance as well as all of the low power processors running substantially simultaneously. Such heterogeneous multiprocessors have operating systems specially written to handle multiprocessing comprising a scheduler serving to re-allocate processors to different processing tasks, albeit relatively infrequently.

To migrate a process between different processors of a multiprocessor system, the multiprocessor operating system is required to save all of its run-time state from a source processor to external memory and then to reload all (or a substantial portion) of that run time state on to the destination processor. It typically takes the operating system several thousand processing cycles to reload the necessary processor state. Furthermore, once the state has been reloaded there will typically be some start-up performance cost associated with the task migration on the destination processor while contents of structures like caches, translation lookaside buffer (TLB) and branch history tables adjust to the migrated instruction stream. The cost of entering the operating system and the cost of the transfer of processor state means that migration of a process has a high cost in terms of both processing time and energy in such known heterogeneous multiprocessor systems. Thus there is a requirement for more efficient migration of one or more processing tasks between different processors.

It is also known to manage processor power consumption by using fine-grain power configurable processors in which individual components of the high performance processor each have a high-performance configuration and a lower performance (but more energy-efficient configuration). In this case the overall structure of the processor remains the same and instructions travel through the processor via much the same path. For example, a high performance processor may comprise super scalar processor with multiple ALU (arithmetic logic unit) pipeline where all but one ALU pipeline can be powered down to improve energy efficiency. A further example is high power high performance data processors comprising branch predictors that can switch between highly aggressive and less aggressive speculation about the future course of the instruction stream.

In such fine-grain power configurable processors no state transfer is required to move between the high performance and the high efficiency modes. However, a disadvantage of this fine-grain power configurable processing is that the inclusion of the high efficiency mode can introduce extra transistor gates into critical paths that can in turn reduce the maximum performance of the high efficiency mode. Furthermore in the high efficiency mode signals are required to travel over the full area of the high performance processor which means that signals are required to propagate over considerable distances. This increases the signal loading and thus increases power dissipation. Furthermore reducing static power consumption in fine-grain dynamically configurable processors is problematic because it is not easy to cut off power to unused circuits in these systems due to the fact that power switching is necessarily distributed throughout the design of the high performance processor.

Thus there is the requirement for an alternative way of implementing processor performance scaling that simplifies implementation of the high performance and the high efficiency modes of operation and enables static leakage current to be reduced an a further requirement to more efficiently migrate processing tasks between processors.

SUMMARY OF THE INVENTION

According to a first aspect the present invention provides apparatus for processing data comprising:

first processing circuitry configured to operate in a first power domain;

second processing circuitry configured to operate in a second power domain different from said first power domain;

shared processing circuitry configured to operate in a shared power domain such that said first processing circuitry and said shared processing circuitry are configurable to operate together to form a first hybrid processing unit having access to an external memory and said second processing circuitry and said shared processing circuitry are configurable to operate together to form a second hybrid processing unit having access to said external memory, wherein said first hybrid processing unit and said second hybrid processing unit together comprise a uni-processing environment for executing a single instruction stream;

execution flow transfer circuitry for transferring execution of said single instruction stream between said first hybrid processing unit and said second hybrid processing unit at a transfer execution point, wherein said execution flow transfer comprises transfer of at least one bit of processing-state restoration information from a source one of said first hybrid processing unit and said second hybrid processing unit to a destination one of said first hybrid processing unit and said second hybrid processing unit, said processing-state restoration information being information enabling said destination hybrid processing unit to successfully resume execution of said single instruction stream from said transfer execution point.

The present invention recognises that processor performance scaling can be provided in an efficient manner by providing first processing circuitry operating in a first power domain and second processing circuitry operating in a second different power domain and providing shared processing circuitry operating in a shared power domain and configurable to operate together with either the first processing circuitry or the second processing circuitry. Although there are at least two sets of non-shared processing circuitry, the apparatus represents a uni-processing environment for executing a single instruction stream such that either the first processing circuitry and the shared processing circuitry are operating together as a first hybrid processing unit or the second processing circuitry and the shared processing circuitry are operating together as a second hybrid processing unit and execution of a single instruction stream can be migrated between the first hybrid processing circuitry and the second hybrid processing circuitry using execution flow transfer circuitry.

The execution flow transfer circuitry is capable of directly (without routing via external or main memory) transferring at least one bit of processing state restoration information between the first hybrid processing unit and the second hybrid processing unit. Since only one of the first processing circuitry and the second processing circuitry is in control of execution of the single instruction stream at any one time, the system is configured to provide both a high performance and a high efficiency (lower power) point by arranging that one of the first processing circuitry and the second processing circuitry is higher efficiency processing circuitry and the other of the first processing circuitry and the second processing circuitry is a higher performance processing circuitry. Since the higher efficiency processing circuitry can be readily powered down when the higher efficiency circuitry is in operation, the static leakage power can be reduced. This allows a lower minimum power-performance point to be attainable with DVFS than would be possible using a single high performance processor and DVFS.

Even without DVFS the present invention offers performance scaling while avoiding the requirement for any complex power supply and clocking circuitry since the data processing apparatus offers performance scaling without necessarily being capable of dynamic voltage and frequency changes. By providing the capability to directly transfer state between the first hybrid processing unit and the second hybrid processing unit using the execution flow transfer circuitry, migration time for migrating the single instruction stream between the two hybrid processing units can be reduced. Furthermore, the shared processing circuitry enables at least a subset of the processing state restoration information to be readily accessible to both hybrid processing units without the requirement to store the processing state restoration information out to external (off-chip) memory, requiring it to be reloaded as part of the migration operation.

The system according to the present technique is simple since it provides a uni-processing environment in which an operating system can effectively see a single processing circuit operating in (i) a high performance and (ii) a high efficiency mode rather than seeing two separate processors. In known multiprocessor systems typically a special multiprocessing operating system is required to manage migration of execution of an instruction stream. The transfer of the at least one bit of processing-state restoration information from a source hybrid processing unit to a destination hybrid processing unit using the execution flow transfer circuitry to avoid the transfer involving first copying the data to the main (external) memory means that the transfer is typically faster and requires less energy. This means the minimum period of low performance for which it is worth switching over can be reduced, which in turn means that more time can be spent in the lower power state and more energy can be saved.

According to the present technique execution flow transfer circuitry is provided to manage the migration of the single instruction stream. Thus, according to at least embodiments of the present invention, migration of the instruction stream can be performed without necessarily requiring an operating system to manage it. For example, the migration can be triggered directly via a user-mode program instruction without having to enter any operating system. Since entering an operating system can take several thousand processing cycles, the ability to circumvent involvement of the operating system in the instruction stream migration makes it possible to switch modes more rapidly. Furthermore, since it is possible to make migration of execution of the instruction stream rapid, it is also possible to automatically work in a high performance mode on entering the operating system.

In contrast to fine-grain dynamically configurable processors, the present invention provides a relatively simple power-domain map, having a first power domain for the first processing circuitry, a second different power domain for the second processing circuitry and a shared power domain for the shared processing circuitry. The design, fabrication, implementation and testing of the data processing apparatus according to the present technique because the high performance circuitry and the high efficiency circuitry (corresponding to one or other of the first processing circuitry and the second processing circuitry) are not fine-grain intermingled.

It will be appreciated that it is possible that the first processing circuitry and the second processing circuitry have substantially the same processing performance characteristics, but that a single instruction stream can be switched between the two distinct sets of processing circuitry. However, in some embodiments, the first processing circuitry and the second processing circuitry have different processing performance characteristics. This makes the data processing system adaptable to different power performance tuning requirements by enabling one of the first processing circuitry and second processing circuitry to have relatively high performance, and the other of the first processing circuitry and the second processing circuitry to have relatively higher efficiency and relatively lower performance. Thus, when computationally intensive processing tasks are to be performed, execution of the single instruction stream can be controlled by the processing circuitry having the higher performance characteristics, yet when the workload becomes less demanding or when external factors such as device battery life becomes low, execution of the single instruction stream can be relatively seamlessly switched to the lower-power higher-efficiency processing circuitry. The (first or second) processing circuitry that is not currently in control of execution of the instruction stream may be powered down to further improve the power saving capabilities.

It will be appreciated that although only one of the first processing circuitry and the second processing circuitry has control of execution of the instruction stream at any one time, the set of processing circuitry that does not have active control of execution of the instruction stream could remain idle throughout the duration of the processing task. However, according to some embodiments, the execution flow transfer circuitry comprises power control circuitry for independently controlling power to the first processing circuitry and the second processing circuitry such that each of the first processing circuitry and the second processing circuitry can be placed in the powered-up state in which it is ready to perform processing operations and a power-saving state in which it is awaiting activation (not ready to perform processing). Provision of the power-saving state allows static power consumption to be further reduced.

It will be appreciated that since the shared processing circuitry will typically be used (at least in part) for the full duration of any processing activities. It will be used either by the first processing circuitry as part of the first hybrid processing unit or by the second processing circuitry as part of the second hybrid processing unit.

In some embodiments the power control circuitry can be configured to independently control power to the shared circuitry as well as to the first processing circuitry and the second processing circuitry. This enables static power consumption to be reduced, for example, when both the first processing circuitry and the second processing circuitry are idle (not performing a processing workload).

The shared processing circuitry can be utilised regardless of whether the first processing circuitry or the second processing circuitry currently has control of execution of the single instruction stream, so the shared processing circuitry could be configured to operate at the same level of power consumption regardless of whether the first or the second processing circuitry is in control of execution. However, in some embodiments, the power control circuitry is configured so that the shared processing circuitry operates at a first level of power consumption when the first hybrid processing unit has control of execution and to operate at a second, different level of power consumption when a second hybrid processing unit has control of execution of the single instruction stream. This means that, for example, the shared processing circuitry can be configured to support high performance processing (by one of the first processing circuitry and the second processing circuitry) by operating at a higher level of power consumption to provide, for example, improved cache performance but to operate at a lower power consumption when the apparatus is in a high efficiency mode (where the one of the first and second processing circuitry that currently has control of execution of the single instruction stream is configured to be high efficiency processing circuitry). This provides additional flexibility in tuning the performance of both the higher performance mode of operation and the higher efficiency mode of operation by improving processing performance in the higher performance mode yet further reducing power consumption in the high efficiency mode of operation.

It will be appreciated that the process of execution transfer could involve switching execution between an active processor (source) and quiescent idle processor (destination). However, in some embodiments, the power control circuitry is configured to switch one of the first processing circuitry and the second processing circuitry corresponding to the destination hybrid-processing unit from a power-saving state to a powered-up state and switch the other of the first processing circuitry and the second processing circuitry corresponding to the source hybrid processing unit from a powered-up state to a power-saving state as part of the execution transfer process.

Although the first processing circuitry and the second processing circuitry could have a variety of different individual processing characteristics, according to some embodiments, the first processing circuitry and the second processing circuitry are architecturally compatible but the first processing circuitry differs micro-architecturally from the second processing circuitry. The architectural compatibility of the first processing circuitry and second processing circuitry facilitates straightforward transfer of processing-state restoration information when migrating execution of the single instruction stream between the first processing circuitry and the second processing circuitry. Arranging for micro-architectural differences between the first processing circuitry and the second processing circuitry is a convenient mechanism for providing diversity in performance levels and energy consumption levels when performing processing tasks.

In some embodiments, the architectural compatibility comprises compatibility of at least general purpose registers and control registers of the first processing circuitry and the second processing circuitry. In some such embodiments, the control registers comprise co-processor registers having at least one memory circuitry control register.

In some embodiments where the first and second processing circuitries are architecturally compatible but micro-architecturally different, the micro-architectural differences between the first processing circuitry and the second processing circuitry comprise at least one of: pipeline length, instruction issue width, cache configuration, branch prediction capability and TLB configuration. Such differences in micro-architecture are straightforward to implement and fabricate.

It will be appreciated that the first processing circuitry and the second processing circuitry could each have any one of a variety of different processing performance characteristics, but according to some embodiments one of the first processing circuitry and the second processing circuitry is higher performance processing circuitry relative to the other of the first processing circuitry and the second processing circuitry and the other of the first processing circuitry and the second processing circuitry is higher efficiency processing circuitry relative to the other. This provides good complementary processing characteristics between the first processing circuitry and the second processing circuitry making the system readily adaptable to many different processing applications.

In some embodiments, the apparatus is fabricated on a single integrated circuit with the higher performance processing circuitry being substantially physically localised to a first distinct area of the integrated circuit and the higher efficiency processing circuitry being substantially physically localised to a second distinct area of the integrated circuit and wherein the second distinct area is different from the first distinct area.

Having the circuits associated with a higher-performance processing physically close to each other and the circuits associated with the energy-efficient processing region physically close to each other rather than being distributed across the whole area of the processor may seem inefficient as it requires duplicating some processing circuitry that is needed in both regions. However, there are high overheads in integrating unit-level clock gating or power switching and input/output signal clamping in a fine-grain distributed manner across a large processor. The power switching has an area overhead and the signal clamping can lengthen critical paths, reducing the peak clock frequency. Thus according to such embodiments, although there is a cost with regard to duplication of some processing circuitry, this is compensated for the fact that the clock gating or power-gating and input/output signal clamping is simplified and the critical paths in the higher performance processing region are not impacted much by the energy-efficient mode. Furthermore, the distance that many signals need to travel in the high efficiency low-energy mode can be effectively reduced, making the data processing apparatus more energy efficient overall.

Although the shared power domain could be configured to operate at the same voltage as one of the voltages corresponding to the first power domain and the second power domain, in some embodiments the apparatus is fabricated on a single integrated circuit and the shared power domain is configured to operate at a different voltage from the voltages corresponding to each of the first power domain and the second power domain.

It will be appreciated that the shared processing circuitry could comprise any of a variety of different processing components that are jointly accessible by both the first processing circuitry and the second processing circuitry. The sharing avoids duplication of that particular type of shared processing circuitry in both the first processing circuitry and the second processing circuitry. However, in some embodiments, the shared processing circuitry comprises cache circuitry. This cache sharing at least reduces the circuit area penalty that would otherwise be required to individually provide caches to the first processing circuitry and the second processing circuitry.

In some such embodiments with shared cache circuitry, the shared cache circuitry is configured to serve as a level two cache for the higher performance processing circuitry and configured to serve as a level one cache for higher efficiency processing circuitry. This provides sharing of resources yet allows for the higher performance processing circuitry to have a non-shared level one cache and thus to have a more complex and versatile cache system than the higher efficiency processing circuitry.

In some embodiments where the shared processing circuitry comprises shared cache circuitry, the shared cache circuitry comprises both level one cache circuitry and level two cache circuitry, where each of the level 1 cache circuitry and the level 2 cache circuitry serves both the higher performance processing circuitry and the higher efficiency processing circuitry. By sharing level 1 and level 2 caches, the amount of refilling of caches from main (external) memory after switches between source and destination hybrid processing units is reduced.

In some embodiments, the shared processing circuitry comprises translation lookaside buffer circuitry. This reduces or avoids the circuit area penalty of providing two TLB's and the need to save and restore the TLB state.

It will be appreciated that the shared processing circuitry could comprise any one of a number of different types of processing circuitry, but in some embodiments the shared processing circuitry comprises at least one of: cache circuitry, translation lookaside buffer circuitry, special purpose registers, bus interface circuitry, bus pins and trace circuitry. This reduces the volume of state that needs to be specifically transferred between the first processing circuitry and the second processing circuitry, since it is accessible directly via the shared processing circuitry.

The non-shared processing circuitry of the first processing circuitry and/or the second processing circuitry could comprise a variety of different processing circuitry components. However, in some embodiments the first processing circuitry and the second processing circuitry comprise at least one of: a program counter, general purpose registers, branch prediction circuitry, decoding/sequencing circuitry, an execution data path and load/store circuitry. Each of the individual components of the first processing circuitry and the second processing circuitry can thus be differently configured according to the processing performance requirements to tune it towards either high performance or high efficiency.

It will be appreciated that the execution flow transfer circuitry could be configured in a variety of different ways to provide a transmission pathway for the at least one bit of processing state restoration information. However, in some embodiments, the execution flow transfer circuitry is configured to provide a transmission pathway from the source hybrid processing unit to the destination hybrid processing unit for the at least one bit of processing state restoration information and wherein the transmission pathway bypasses the external memory. Bypassing of the external memory reduces the time penalty in terms of processing cycles for performing the transfer of execution of the single instruction stream because accesses to external memory are typically processing-cycle intensive. In some such embodiments, the transmission pathway comprises a dedicated buffer between the first processing circuitry and the second processing circuitry. This is a simple way of implementing a direct transfer path between the two set of processing circuitry.

It will be appreciated that the at least one bit of processing state restoration information transferred by the execution flow transfer circuitry could be any one of a number of different types of architectural state required to enable successful resumption of execution of an instruction stream on destination processor circuitry that was previously executing on source processing circuitry. However, in one embodiment, the at least one bit of processing state restoration information comprises at least one of: a program counter and at least a subset of the general purpose register content of the source hybrid processing unit at the transfer execution point.

It will be appreciated that the at least one bit of processing state restoration information transferred by the execution flow transfer circuitry could be any one of a number of different types of micro-architectural state required to reduce the time and energy expended by the destination processor in re-constituting that state corresponding to the source processor. However, in one embodiment, the at least one bit of processing state restoration information comprises at least one of: branch predictor history information, TLB contents, micro-TLB contents and data prefetcher pattern information.

In some embodiments of the data processing apparatus, at least the source hybrid processing unit comprises an associated non-shared cache (separate from the shared processing circuitry) as part of one of the first processing circuitry and the second processing circuitry corresponding to the source hybrid processing unit, the associated non-shared cache being separate from the shared processing circuitry. In such embodiments the non-shared cache of the first hybrid processing unit is cleaned as part of the execution flow transfer process and circuitry is provided that allows data and instructions required by the instruction stream executing on second hybrid processing unit to be obtained from the cache of the first hybrid processing unit. Typically the data and instructions would then be cached in the second hybrid processing unit or the shared processing circuitry. This improves the efficiency of the system by reducing the likelihood of having to retrieve data from external memory when execution of the transferred single instruction stream that has been suspended on the source processing unit is resumed on the destination processing unit. As an alternative to cleaning the non-shared cache as part of the transfer, the non-shared cache can use a write-back policy so that it is always clean.

It will be appreciated that the transfer of execution of the single instruction stream from the source hybrid processing unit to the destination hybrid processing unit could be triggered in a number of different ways, for example, via hardware, software or an operating system. However, in some embodiments, the execution flow transfer circuitry is configured to initiate transfer of execution of the single instruction stream from the source hybrid processing unit to the destination hybrid processing unit in response to a hardware trigger such as a temperature sensor, a series of cache misses, the initiation of a hardware page table walk or the processor entering a polling or wait-for-interrupt state. A hardware triggered transfer is functionally transparent to an operating system and any other software executing on the data processing apparatus. Providing an execution flow transfer trigger that is transparent to the operating system and software reduces the processing cycle penalty required to achieve the transfer of execution. The alternative of entering the operating system to perform the execution flow transfer would typically have a significant cost in terms of time and energy.

In alternative embodiments, the execution flow transfer circuitry is configured to initiate transfer execution of the single instruction stream from the source hybrid processing unit to the destination hybrid processing unit in response to an external trigger. In some such embodiments the external trigger is configured to receive a trigger stimulus from at least one of a temperature monitor external to the uni-processor, a power controller and memory mapped input/output.

In other embodiments the execution flow transfer circuitry is configured to initiate transfer of the execution of the single instruction stream from the source hybrid processing unit to the destination hybrid processing unit in response to a software trigger. This provides more flexibility in triggering the execution flow transfer according to current software processing requirements. In some such embodiments the software trigger is a processor instruction, a write data access to a special purpose register or a write data access to a specific address in a memory map.

Although the software trigger could be performed in any one of a number of different ways, in some embodiments virtualisation software running on the data processing apparatus provides a software trigger. The virtualisation software serves to mask configuration control information specific to the first processing circuitry and the second processing circuitry from the operating system executing on the data processing apparatus. Thus the transfer of execution of the single instruction stream is transparent to both the operating system and the one or more applications executing on the data processing apparatus at a time corresponding to the transfer execution point. This means that the operating system need not be aware of the migration of the execution of the instructions between the first processing circuitry and the second processing circuitry and any applications of the processing workload need not be adapted to execute on the data processing apparatus. Avoiding requirements to modify operating systems and applications to run on the data processing apparatus in order to make use of the power performance scaling characteristics makes the data processing apparatus more versatile and readily adaptable to use with generic software and operating systems.

It will be appreciated that the first processing circuitry and the second processing circuitry could be configured to operate at a single voltage and a single frequency. However, further power performance varying properties could be provided by providing performance-level varying circuitry as part of the data processing apparatus configured to vary a processing performance level of at least one of the first hybrid processing unit and the second hybrid processing unit. This provides flexibility in the number of performance levels and efficiency levels to which the apparatus can be tuned.

Although the performance-level varying circuitry could take any one of a number of different forms, in some embodiments performance-level varying circuitry is configured to perform dynamic voltage and frequency scaling of processing performance of at least one of the first hybrid processing unit and the second hybrid processing unit by varying at least one of: a voltage of the first power domain; voltage of the second power domain; a voltage of the shared power domain; a frequency of operation of the first processing circuitry; a frequency of operation of the second processing circuitry; and frequency of operation of the shared processing circuitry.

It will be appreciated that a data processing apparatus, according to embodiments of the present invention could be used exclusively for applications that require a uni-processing environment. However, in some embodiments at least one of the uni-processing data processing apparatuses according to the present technique is employed to form part of a multiprocessing data processing system by connecting a plurality of uni-processors including the at least one uni-processing data processing apparatus according to the present technique via a bus or network. This allows for substantially simultaneous execution of the plurality of instruction streams. Such a system provides a versatility not only to switch execution of an individual instruction stream between a high performance mode and a high efficiency mode, but also to switch individual instruction streams between different ones of the plurality of uni-processing data processing apparatuses. In some embodiments the multi-processing data processing system only a subset of the uni-processors support switching of execution of an individual instruction stream between a high performance mode and a high efficiency mode. This provides very flexible system that is adaptable to many different power and performance characteristics.

According to a second aspect the present invention provides apparatus for processing data comprising:

first means for processing configured to operate in a first power domain;

second means for processing configured to operate in a second power domain different from said first power domain;

means for shared processing configured to operate in a shared power domain such that said means for first processing and said means for shared processing are configurable to operate together to form a first means for hybrid processing having access to an external memory and said second means for processing and said means for shared processing are configurable to operate together to form a second means for hybrid processing having access to said external memory, wherein said first means for hybrid processing and said second means for hybrid processing together comprise a uni-processing environment for executing a single instruction stream;

means for execution flow transfer for transferring execution of said single instruction stream between said first means for hybrid processing and said second means for hybrid processing at a transfer execution point, wherein said execution flow transfer comprises transfer of at least one bit of processing-state restoration information from a source one of said first means for hybrid processing and said second means for hybrid processing to a destination one of said first means for hybrid processing and said second means for hybrid processing, said processing-state restoration information being information enabling said destination means for hybrid processing to successfully resume execution of said single instruction stream from said transfer execution point.

According to a third aspect the present invention provides A data processing method comprising the steps of:

operating first processing circuitry in a first power domain;

operating second processing circuitry in a second power domain different from said first power domain;

operating shared processing circuitry in a shared power domain and forming a first hybrid processing unit by operating said first processing circuitry and said shared processing circuitry together, said first hybrid processing unit having access to an external memory;

forming a second hybrid processing unit by operating and said second processing circuitry and said shared processing circuitry together, said second hybrid processing unit having access to said external memory;

providing a uni-processing environment for executing a single instruction stream, said uni-processing environment comprising said hybrid processing circuitry and said second hybrid processing circuitry together;

transferring execution of said single instruction stream between said first hybrid processing circuitry and said second hybrid processing circuitry at a transfer execution point using transfer execution circuitry, wherein said execution flow transfer comprises transfer of at least one bit of processing-state restoration information from a source one of said first hybrid processing unit and said second hybrid processing unit to a destination one of said first hybrid processing unit and said second hybrid processing unit, said processing-state restoration information being information enabling said destination hybrid processing unit to successfully resume execution of said single instruction stream from said transfer execution point.

The above, and other objects, features and advantages of this invention will be apparent from the following detailed description of illustrative embodiments which is to be read in connection with the accompanying drawings.

DESCRIPTION OF EMBODIMENTS

Figure 1:
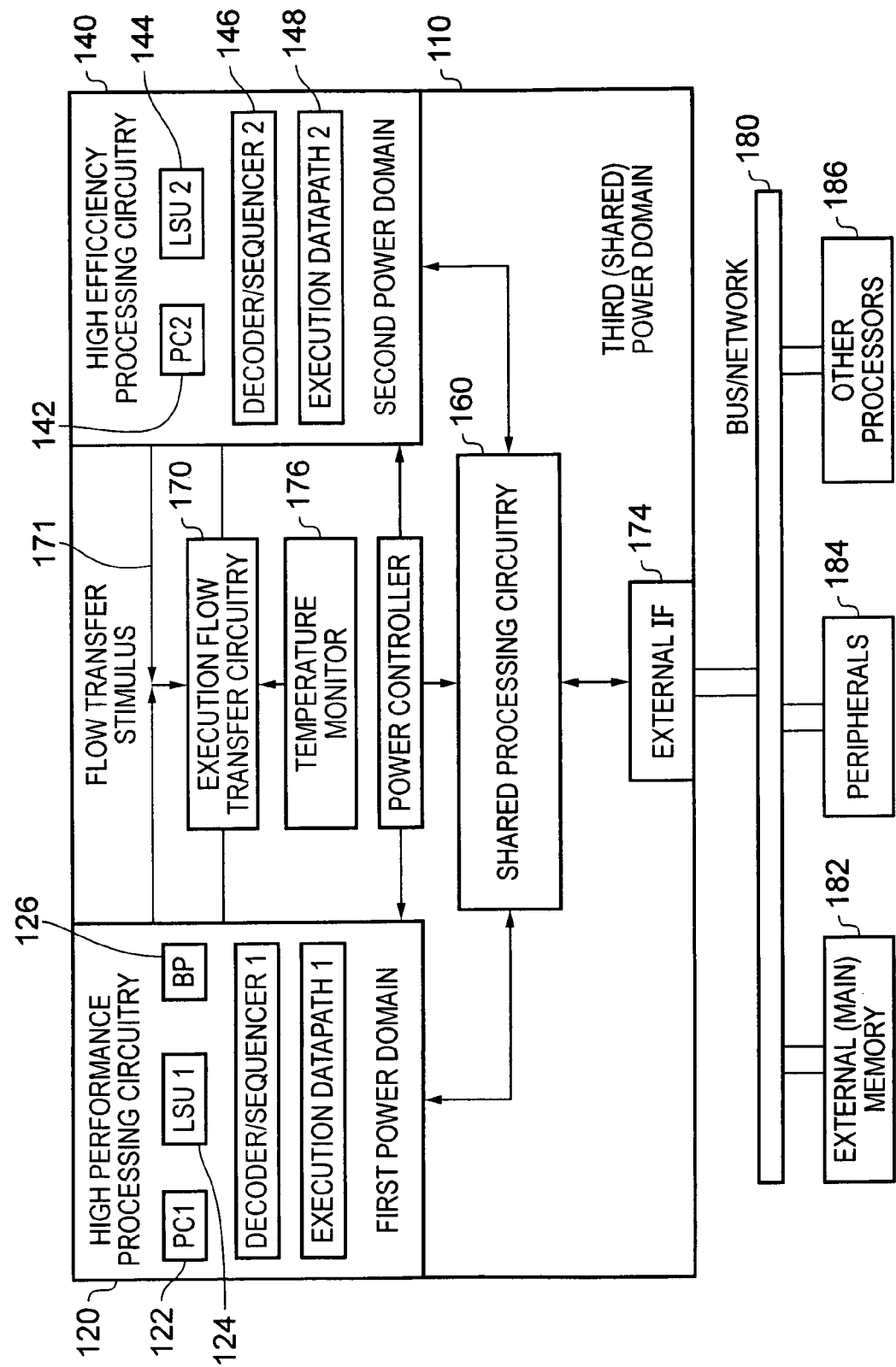
FIG. 1 schematically illustrates a data processing apparatus having high-performance processing circuitry, high-efficiency processing circuitry and shared processing circuitry.

FIG. 1 schematically illustrates a uni-processing data processing apparatus 100 having two distinct sets of processing circuitry and shared processing circuitry. The data processing apparatus 100 comprises a single integrated circuit 110 on which are fabricated: high performance processing circuitry 120 fabricated primarily on a distinct physical region (or sub-region) of the integrated circuit 110; and high efficiency processing circuitry 140 substantially fabricated on a separate distinct physical area of the integrated circuit 110 from the high performance processing circuitry. The apparatus further comprises a set of shared processing circuitry 160 that is accessible to either the high performance processing circuitry 120 or the high efficiency processing circuitry 140 depending upon which of the two sets of processing circuitry 120, 140 has current control of the execution of the single instruction stream of the uni-processor 100.

To enable transfer of execution of the single instruction stream between the high performance processing circuitry 120 and the high efficiency processing circuitry 140, a set of execution flow transfer circuitry 170 is provided. The integrated circuit 110 of the data processing apparatus 100 performs data input/output to a bus 180 (in alternative embodiments the bus 180 is an inter-core network corresponding to a Network-on-chip) via bidirectional communication with an external interface 174. This bus 180 is also used by the integrated circuit 110 to perform a communication with an external (main) memory 182, a set of peripheral devices 184 and further processors 186.

The high performance processing circuitry 120 is designed primarily for good processing performance whereas the high efficiency processing circuitry 140 is designed primarily for high efficiency and reduced energy consumption (relative to the high performance processing circuitry 120). Although the high performance processing circuitry 120 and the high efficiency processing circuitry 140 are combined on a single integrated circuit 110, they operate in different power domains i.e., the high performance processing circuitry 120 operates in a first power domain whilst the high efficiency circuitry 140 operates in a second, different power domain. The shared processing circuitry 160 and the execution flow transfer circuitry 170 are both configured to operate in a third (shared) power domain. Due to the three different power domains some clamping or level shifting of signal voltages is performed by circuitry (not shown) on the integrated circuit 110.

The high performance processing circuitry 120 comprises the first program counter 122, the first load store unit 124, branch prediction circuitry 126, a first decoder/sequencer 128 for decoding and sequencing the instruction stream and a first execution data path 130 for executing program instructions. The execution data path 130 of the high performance processing circuitry 120 has a long pipeline that is deep and out-of order and the branch prediction circuitry 126 is capable of complex branch prediction and these two characteristics contribute to the high performance level of this circuitry 120.

The high efficiency (comparatively low performance) processing circuitry 140 comprises: a second program counter 142 that keeps track of the instructions being executed when the high efficiency processing circuitry 140 has control of the single execution stream; a second load store unit 144 for loading instructions from cache and/or external memory 182; a second decoder/sequencer 146 and a second execution data path 148.

The second execution data path 148 is a single issue execution data path with a relaxed shallow pipeline. There is no branch prediction circuitry in the high efficiency processing circuitry 140 in the embodiment of FIG. 1. In alternative embodiments both the high performance and the high efficiency processing circuitry are provided with branch prediction circuitry but the high efficiency processing circuitry uses simpler branch prediction.

The integrated circuit 110 of the data processing apparatus 100 of FIG. 1 can be viewed as an integrated circuit in which a high performance processing core 120 and a high efficiency processor core 140 are merged and in which one or more resources on the integrated circuit 110 are shared by the high performance processing circuit 120 and the high energy high efficiency processing circuitry 140. The resources of the shared processing circuitry 160 depend on the particular embodiment, but examples of the shared resources include bus pins, a bus interface unit (BIU), control registers, a TLB or L1 and/or L2 caches.

In the arrangement of FIG. 1, only one of the high performance processing circuitry 120 and the high efficiency processing circuitry 140 is operational at any single point in time. However, in order to perform execution of instructions, both the high performance processing circuitry 120 and the high efficiency processing circuitry have use of the shared processing circuitry 160. Execution of a single instruction stream can be switched between the high performance processing circuitry 120 and the high efficiency processing circuitry 140 according to the current processing requirements and/or according to external factors such as the external temperature or the remaining battery life of the data processing apparatus incorporating the integrated circuit 110.

The switching of the single instruction stream between the two different sets of processing circuitry 120, 140 is mediated by the execution flow transfer circuitry 170. In order to perform transfer of execution of the instruction stream, at least one bit of processing-state restoration information is copied from a "source" one of the high performance processing circuitry 120 and the high efficiency processing circuitry 140 and a "destination" one of these two sets of processing circuitry 120, 140. Transfer of execution of the single instruction stream between the two different sets of processing circuitry necessarily involves enabling the destination processing circuitry to be able to resume processing from a point where processing ceased on the source processing circuitry. Since only one of the high performance processing circuitry 120 and the high efficiency processing circuitry 140 is operational at any one point in time, it can be seen that the shared processing circuitry is also dedicated to operating with either the high performance processing circuitry 120 or the high efficiency processing circuitry 140 at any one point in time according to which set of circuitry holds control of the instruction stream execution.

The configuration of the shared processing circuitry 120 (shared between the high performance circuitry 120 and the high efficiency processing circuitry 140) simplifies the task of switching execution because it allows the destination processing circuitry to can access at least some of the processing state of the source processing circuitry at the execution transfer point via the shared processing circuitry 160.

The transfer of execution of the instruction stream is initiated by the execution flow transfer circuitry 170 in response to receipt of the flow transfer stimulus 171. The flow transfer stimulus 171 can be provided via a hardware trigger from other processing circuitry within the data processing apparatus or from an external trigger. The flow transfer stimulus 171 in this example embodiment can originate from either the high performance processing circuitry 124 or from the high efficiency processing circuitry 140. The hardware trigger may be, for example, at least one of: a temperature sensor, a series of cache misses, initiation of a hardware page table walk, processing circuitry entering a polling state and processing circuitry entering a wait-for-interrupt state. A temperature monitor 176 is shown in the embodiment of FIG. 1 and this is configured to output a transfer stimulus to the execution flow transfer circuitry 170 to effect transfer of execution to the high efficiency processing circuitry when the detected temperature exceeds a predetermined threshold value. In alternative embodiments the flow transfer stimulus is provided in response to a software trigger or in response to an external trigger such as a change in temperature or a sudden reduction in available battery power. Alternatively, the software trigger is: a processor instruction (e.g. a special execution flow switching instruction); a write to a special purpose register such as the CP15 register in ARM™ processors; or a write to a specific address in a memory map of the data processing system. The high performance processing circuitry 120 and the high efficiency processing circuitry 140 execute program instructions using resources provided in the shared processing circuitry 160 so that the high performance processing circuitry 120 and the shared processing circuitry 160 can be together considered as a first hybrid processing unit. Similarly, the high efficiency processing circuitry 140 together with the shared processing circuitry 160 form a second hybrid processing unit. However, it will be appreciated that, depending on the particular instruction being processed the resources of the shared processing circuitry 160, although available, may or may not be utilised during execution of individual instructions of the single instruction stream.

Figure 2:
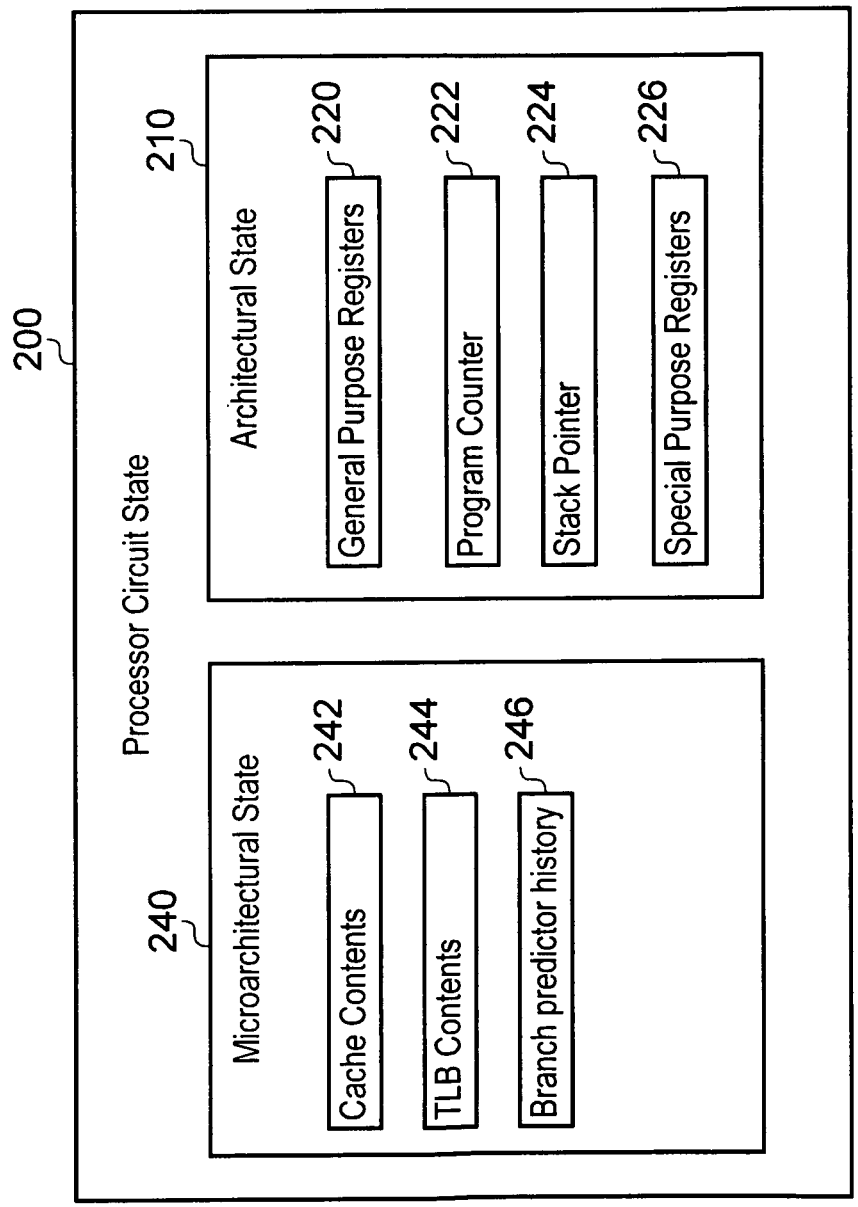
FIG. 2 schematically illustrates constituent elements of processor circuit state information comprising both architectural and micro-architectural state.

FIG. 2 schematically illustrates different categories of processor state information. The processing circuitry of FIG. 1 comprises circuit elements such as flip-flops and Random Access Memories (RAMs) that hold state information. Typically this state information is updated upon changes a clock signal. The processor circuit state 200 as illustrated in FIG. 2 comprises all of the state held by circuits in the corresponding processor. The processor circuit state 200 illustrated by FIG. 2 could represent either: the processor state of a first hybrid processor unit corresponding to a combination of the high performance processing circuitry 120 and the shared processing circuitry 160 of FIG. 1; or a second hybrid processing unit corresponding to the high efficiency processing circuitry 140 together with the shared processing circuitry 160. As shown in FIG. 2, the processor circuit state 200 comprises both an architectural state 210 and a micro-architectural state 240. The architectural state 210 comprises: general purpose registers 220; a program counter 222; a stack pointer 224; and special purpose registers 226.

The processor architectural state 210 is a subset of the processor state that a software programmer can expect to exist and obey an architecture specification characteristic of all processors that implement a given architecture. The general purpose registers 220, program counter 222, stack pointer 224 and special purpose registers 226 illustrated in FIG. 2 are (non-exhaustive) examples of architectural state. The architectural state 210 can be considered to be a minimum set of processor circuit state that should be preserved before removing power to the processor so that upon stopping execution at an arbitrary instruction in a computer program running on the processor, the preserved state can be used upon resumption of power to allow processing to be successfully restarted at the point it was stopped.

Modern processors are often heavily pipelined and allow many in-flight or partially finished instructions at any one time. In the embodiment of FIG. 1, prior to saving the architectural state 210, any in-flight instruction is completed or cancelled. Any in-flight instructions prior to the instruction on which the processor stopped execution is completed and any instruction after the instruction on which the processor stopped is cancelled. The architectural state 210 is then saved for later use in resumption of processing.

The microarchitectural state 240 as illustrated in FIG. 2 comprises: cache contents 242; Translation Lookaside Buffer (TLB) contents 244 and branch predictor history 246.

The microarchitectural state is the state that exists in a specific processor implementation but that is not defined in the architecture specification to exist in all implementations. A software programmer cannot rely on every implementation of a processor architecture having the same microarchitectural state. The cache contents 242, TLB contents 244 and branch predictor history 246 are non-exhaustive examples of microarchitectural state. In the event that processing is stopped, assuming that the architectural state is saved, it is typically unnecessary to preserve microarchitectural state prior to removing power to the processor in order to later be able to successfully restart processing from the point at which it was stopped. However, preserving some microarchitectural state can improve the performance of the processor for a period after processing is restarted. For example, if the TLB entries are preserved then the processor will have less page table walks to perform in order to obtain virtual to physical address translations shortly after restarting processing. Similarly, if the branch predictor history 246 information is saved prior to removing power to the processor then the branch predictor will perform well immediately upon restart of processing and the branch prediction history will not have to be rebuilt from scratch.

A set of processing state information called "processing state restoration information" can be defined to at least state information that allows processing to be restarted later. It should contain enough information to allow processing to be restarted but may contain more information than that. Typically this means that the processing state restoration information should contain at least the architectural state 210 and in addition may comprise other state. An example of additional state that it may contain is some microarchitectural state such as the TLB contents. Saving microarchitectuaral state in addition to architectural state will likely improve processing performance for a period after processing is restarted (on the same processing circuitry or different but architecturally-compatible processing circuitry).

The high performance processing circuitry 120 and high efficiency processing circuitry 140 of FIG. 1 are capable of implementing privilege levels during execution of program instructions that restrict access to some of the architectural state 210 at certain times. For example, the operating system executed on the data processing apparatus 100 has access to more of the architectural state 210 than a typical program application. However, all of the architectural state 210 is accessible from the highest privilege level.

Two different processors having the same version of the architectural state 210 but having different versions of the micro-architectural state 240 should be able to run the same program instructions, but a given program is likely to take different lengths of time to execute on the two different micro-architectures and expend different amounts of energy.

In the data processing apparatus 100 of FIG. 1, the execution transfer involves ceasing execution of the instruction stream by the source one of the high performance processing circuitry 120 and the high efficiency processing circuitry 140 (depending on which one of these two sets of circuitry is currently actively executing the instruction stream) and restarting the execution of the instruction stream from the same execution point following enactment of the switch. To enable a successful restarting of processing at the execution transfer point on a different set of processing circuitry it is necessary to provide to the destination processing circuitry a set of processing state restoration information representing a subset of the processor state 200 of FIG. 2 as defined above.

It will be appreciated that in addition to the processing state restoration information, to successfully resume execution, the destination processing circuitry should also have access to the relevant program instructions and data in main memory that was being used by the source data processing circuitry to execute the instruction stream. In this particular embodiment the processing state restoration information comprises at least a subset of the architectural state 210 as illustrated in FIG. 2 and thus includes the program counter 222, the general purpose registers 220, the special purpose registers 226 and the stack pointer 224.

The execution flow transfer circuitry 170 of FIG. 1 represents a direct exchange mechanism for processing state restoration information between the high performance processing circuitry 120 and the high efficiency processing circuitry 140. In previously known systems, transferring execution of a single instruction stream from one set of processing circuitry to another set of processing circuitry will typically have involved pushing all of the processing state restoration information from the source processing circuitry held in registers in hardware that would be powered-down after the transfer out into external memory (not powered down) and then reloading all of that information saved to main memory back into the destination processing circuitry.

The direct transfer mechanism for transferring at least a subset of the processing state restoration information between the high performance processing circuitry 120 and the high efficiency processing circuitry 140 of FIG. 1 is an alternative mechanism for transferring a flow of execution to that used in multi-processor systems, where in order to transfer processing from one processor to another processor the source processor is signalled that power will be removed well in advance (i.e. one or more processing cycles) and the amount of processor state that is actually saved in order to enable successful resumption of processing is reduced by ensuring that the source processor finishes all processing associated with instructions in the instruction stream for a special storing instruction. A special stopping instruction is used such that all processing associated with the stop instructions before the processing instruction must be completed before the execution is transferred and all instructions following this stopping instruction in the execution sequence are cancelled. This previously known technique avoids a need to store processor state associated with partially complete instructions.

Another technique of avoiding having to store a full set of processing state restoration information in buffers and caches is to push any values that are temporally being held in buffers or caches out to their intended destinations prior to the transfer of execution. This technique is similar to the techniques used to implement exceptions and interrupts.

However, according to the embodiment of the invention illustrated in FIG. 1, transfer of the processing state restoration information required to successfully resume execution at the transfer execution point is transferred between the source processing circuitry and the destination processing circuitry either: (i) directly via the execution flow transfer circuitry 170 without the requirement to first save in the external memory 182; or (ii) via the shared accessibility to values stored in the shared processing circuitry 160. Thus not all and perhaps none of the processing state restoration information that is in the power domain to be shut down has to be pushed out to memory that will not be powered down.

Examples of processing state restoration information that are transferred between the source processing circuitry and the destination processing circuitry in the event of switching between high performance and high efficiency processing modes comprise a program counter, at least a subset of general purpose register contents of the source hybrid processing unit at the transfer execution point and/or micro-architectural state information such as branch predictor history information, TLB contents, micro-TLB contents and data prefetcher pattern information.

Figure 3:
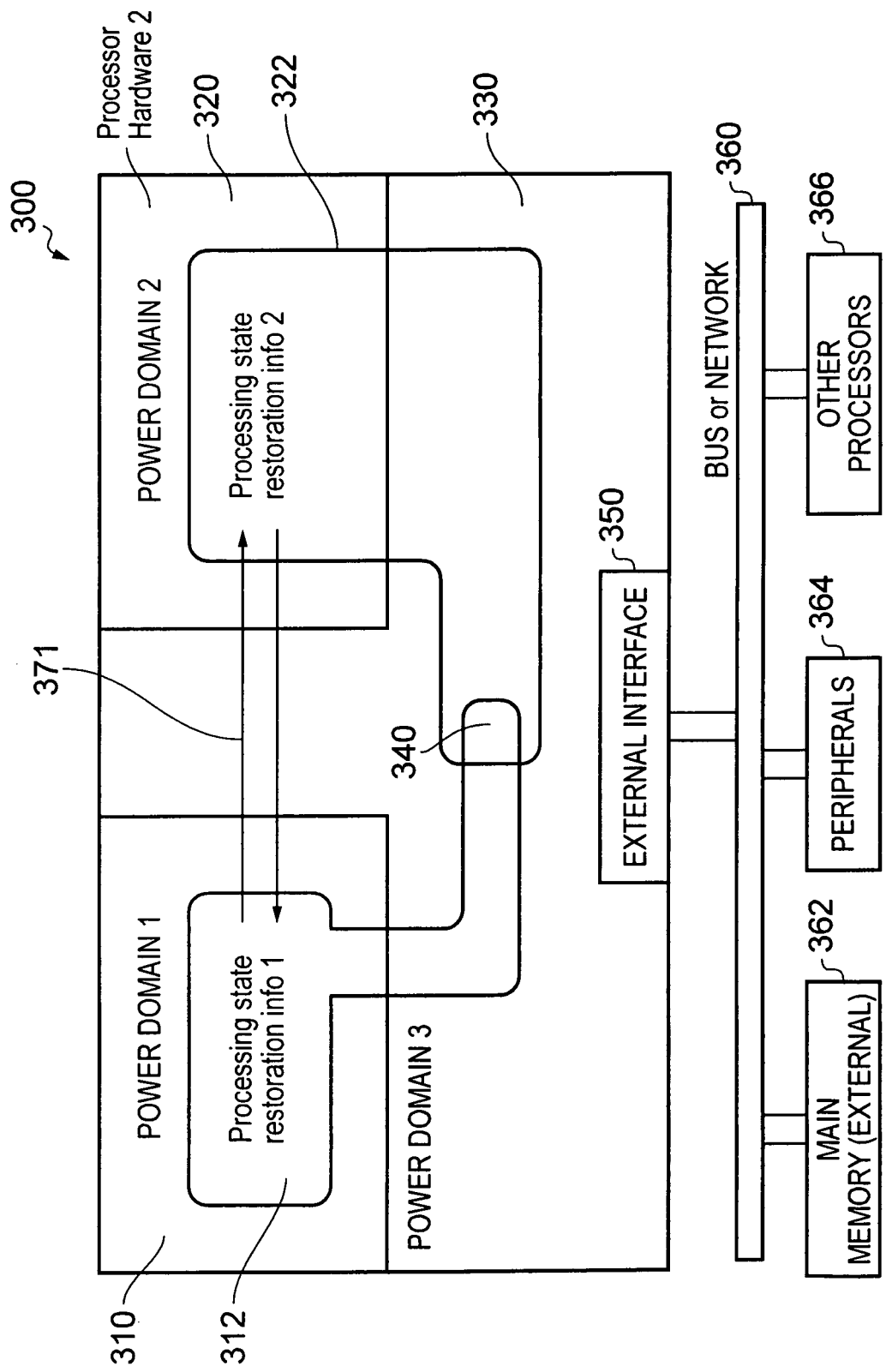
FIG. 3 schematically illustrates a data processing apparatus having shared processing circuitry and three power domains and illustrating a distribution of processing state restoration information across the power domains.

FIG. 3 schematically illustrates the mechanism for transfer of execution of a single instruction stream from the source hybrid processing unit to the destination hybrid processing unit in the system of FIG. 1. As illustrated in FIG. 3, a single integrated circuit 300 corresponds to a uni-processing data processing apparatus having a first power domain 310 corresponding to first processing hardware, a second power domain 320 corresponding to second processing hardware and a third power domain 330 in which shared processing hardware operates. The integrated circuit 300 has an external interface 350 providing a communication pathway with a bus 360 (or a network in alternative embodiments). A main memory (external) 362, a set of peripheral devices 364 and one or more further processors 366 are also connected to the bus 366.

The first processing hardware 310 and the second processing hardware 320 are architecturally compatible but have different micro-architectures. The processing state restoration information of the first hybrid processing unit, which is formed when the first processing hardware 310 has execution control, resides partly in the first power domain 310. However, a portion of the first processing state restoration information also resides in the shared processing circuitry and thus in the third power domain 330. Similarly, the processing state restoration information of the second processing hardware 320 has a portion that resides exclusively in the second power domain 320, but there is also a portion of the second hybrid processing unit processing state restoration information that is stored in the third power domain 330.

It is also clear from FIG. 3 that there is an overlap 340 between the first processing state restoration information 312 and the second processing state restoration information 322 represented by the region of intersection of the two sets of states. The execution flow transfer circuitry 170 of FIG. 1 provides a direct exchange mechanism for at least a portion of the processing state restoration information required to transfer execution of the single instruction stream between the first power domain 310 and the second power domain 320. As shown in FIG. 3, there is a direct processing state restoration exchange pathway 371 between the first processing state restoration information 312 and the second processing state restoration information 322.

Figure 4:
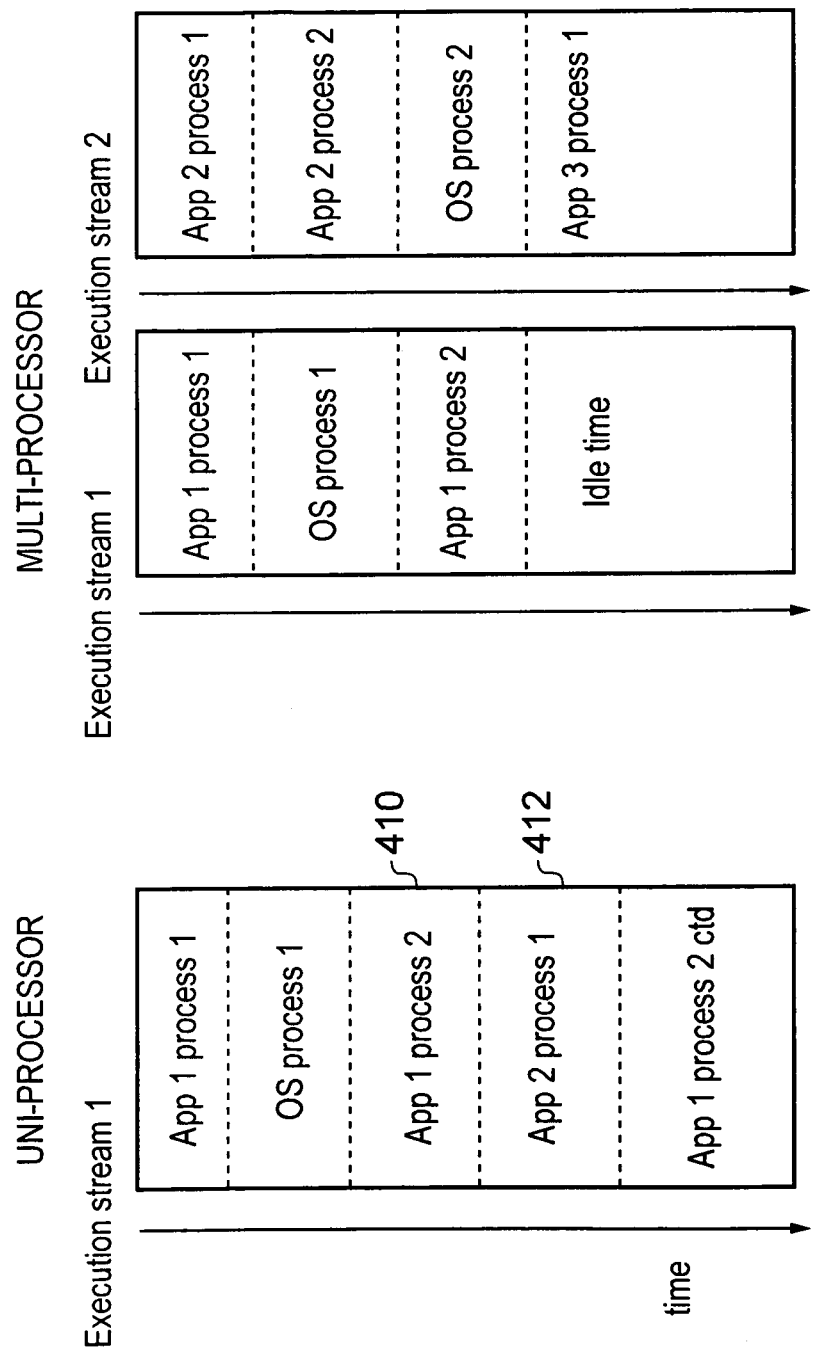
FIG. 4A schematically illustrates a timeline for an execution stream of a known uni-processor.
FIG. 4B schematically illustrates two distinct execution streams and their respective time lines in a known multi-processor system.

The data processing apparatus of FIG. 1 represents a uni-processing environment. FIG. 4A schematically illustrates execution of a single instruction stream according to a conventional uni-processor. A conventional uni-processor executes a single stream of instructions and the uni-processor operating system will typically switch execution between several threads of execution or between processes corresponding to application programs that the processor is executing at the time. However, this type of multithreading in a uni-processing data processing apparatus corresponds to time division multiplexing of the processing hardware to allow sharing of a single instruction stream execution engine.

Thus in the uni-processor device of FIG. 4A, the processing hardware can be running program code from, for example, an operating system or from a program application, but it can never be contemporaneously executing, for example, both operating system instructions and application program instructions. This is clear from the illustration of "execution stream 1" in FIG. 4A where, as time progresses, the uni-processor starts off by executing process 1 of program application 1, proceeds to execute process 1 of operating system software then returns to application 1 to execute process 2 and subsequently executes process 1 of processing application 2.

Note that application 1 process 2 was executed for a first block of time 410, interrupted by process 1 of application 2 executing in time block 412, but execution of process 2 of application 1 is resumed in a later time slot 414, whereupon process 2 is completed. Thus it is clear from FIG. 4A that in a uni-processing processor, a single instruction stream is executing although multi-threading is possible such that the execution time is time-division multiplexed between processes of different applications such as application one and application two and processes corresponding to the operating system.

FIG. 4B schematically illustrates a multi-processor in which two different instruction streams are executed substantially concurrently (or simultaneously). In a multiprocessing system, the physical hardware supports substantially contemporaneous execution of more than one instruction stream. Thus it can be seen that as time progresses, according to a first instruction execution stream "execution stream one", a sequence comprising execution of: application 1 process 1, then application 2 process 2 is performed and then the particular processor running "execution stream 1" becomes idle. Meanwhile, a second processor representing different physical processing hardware runs "execution stream 2", which executes (in time sequence) application 2 process 1 then application 2 process 2 then an operating system process 2 then application 3 process 1.

It can be seen from FIG. 4B that the multiprocessor substantially concurrently executes application 1 process 1 and application 2 process 1 in execution stream 1 and execution stream 2 substantially concurrently. Similarly, operating system process 1 executes substantially simultaneously with application 2 process 2 and application 1 process 2 executes substantially simultaneously with operating system process 2. At any one time, not all of the processors in a multi-processor system need be actually executing instructions. This is illustrated by the last sequence of "execution stream 1" in FIG. 4B, which corresponds to idle time. At this time in the example of FIG. 4B, the second set of processing hardware is executing application 3 process 1.

Further details of different types of processor taxonomy can be found in the textbook Hennessy and Paterson "Computer architecture a quantitive approach", $2^{nd}$ edition on page 636. A multi-processor contains the physical hardware resources necessary to substantially simultaneously process instructions corresponding to multiple instruction streams (i.e. execution streams), whereas a uni-processor has the physical resources to execute only a single instruction stream at any given time.

In normal operation, processing circuitry should process instructions in the order that they occur in the processor memory until a branch or jump instruction causes processing to jump to an instruction from another area of the memory. High performance processing circuitry such as the circuitry 120 of FIG. 1 is capable of internally performing some processing of instructions of an instruction sequence not strictly in the order that the instructions are found in the memory. However, when out of order execution is performed the instruction sequence preserves the same functional behaviour as if the instructions were executed in the actual order that they are found in the memory. The first program counter 122 of FIG. 1 tracks the memory addresses of the instruction being processed by the high performance processing circuitry 120 and the value held by the first program counter 122 advances sequentially between instructions unless a branch jump instruction is taken, in which case the value held by the first program counter circuit 122 changes corresponding to the instruction at the branch or the jump target address. Although the data processing apparatus of FIG. 1 has both the first program counter 122 and a second program counter 142, because the data processing apparatus represents a uni-processing environment only one of the two program counters 122, 142 is active at any given time and only one of the sets of processing circuitry 120, 140 is actively executing instructions at any one time.

Figure 5:
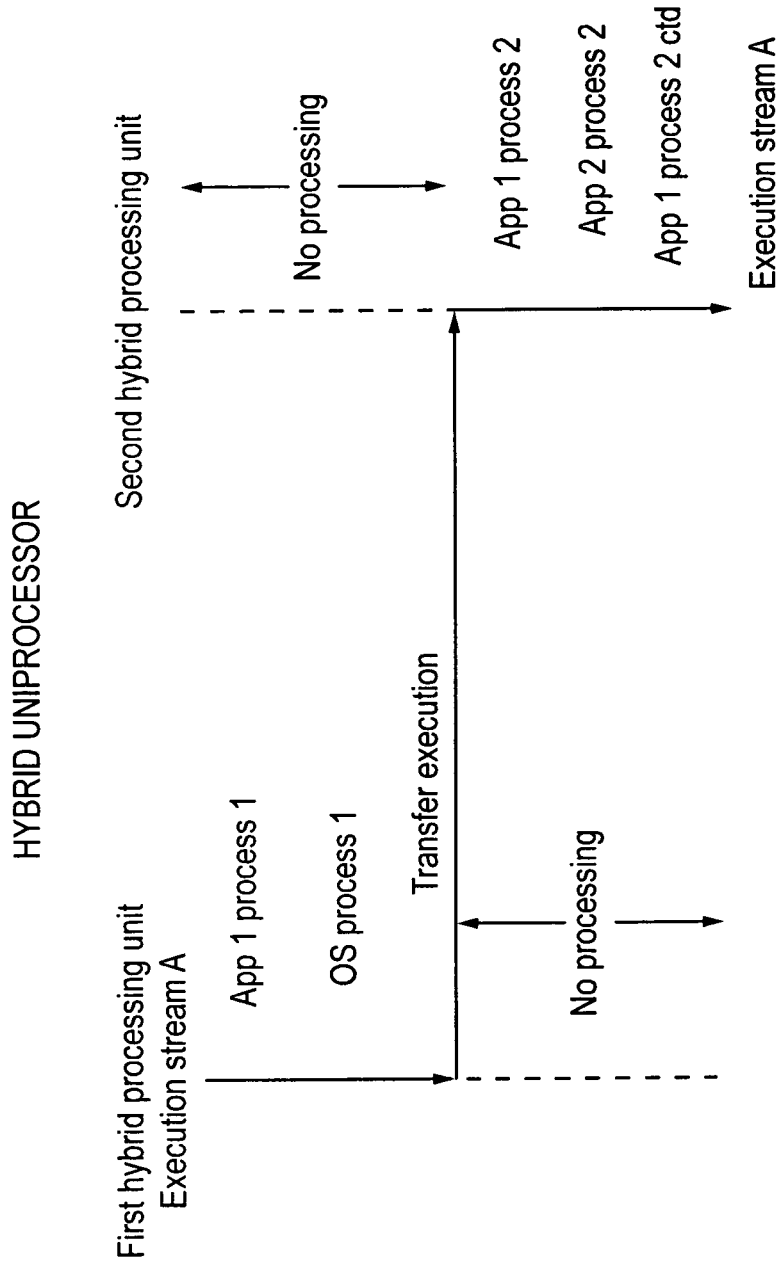
FIG. 5 schematically illustrates an instruction stream execution switching process on a hybrid uni-processor according to an embodiment of the present invention.

FIG. 5 schematically illustrates how the data processing apparatus of FIG. 1 represents a uni-processing environment executing a single instruction stream that can be transferred between a first hybrid processing unit and a second hybrid processing unit. The execution stream illustrated in FIG. 5 corresponds to the same execution stream illustrated for execution by the uni-processor of FIG. 4A. In FIG. 5, execution of the instruction stream A begins with execution of application 1 process 1 on the first hybrid processing unit corresponding to the high performance processing circuitry 120 together with the shared processing circuitry 160 of FIG. 1. Following application 1 process 1, the hybrid uni-processor proceeds to execute operating system process 1. Once operating system process 1 has executed, a flow transfer stimulus is received commanding that execution be transferred from the first hybrid processing unit to the second hybrid processing unit formed by the high efficiency processing circuitry 140 together with the shared processing circuitry 160 of FIG. 1.

It can be seen from the two parallel timelines of FIG. 5 corresponding to the first hybrid processing unit and the second hybrid processing unit, that while the first hybrid processing unit has control of the execution stream and executes application 1 process 1 and operating system process 1, the second hybrid processing unit is idle (i.e. inactive) and performs no processing. During this time period the second hybrid processing unit is powered down to preserve energy. However, once the flow of execution is transferred at the transfer execution point, execution of "execution stream A" is switched from the first hybrid processing unit to the second hybrid processing unit and following execution of operating system process 1 on the first hybrid processing unit, the second hybrid processing unit takes over execution of the instruction stream where the first hybrid processing unit left off and proceeds to execute application 1 process 2 followed by application 2 process 2 followed by the remainder of application 1 process 2.

Thus by comparing and contrasting FIG. 4A and FIG. 5, it can be seen that execution of the single instruction stream is switched between the two different hybrid processing units. Note that once execution has been transferred from the first hybrid processing unit to the second hybrid processing unit the second hybrid processing unit takes control of the execution stream and performs the processing tasks whilst the first hybrid processing unit (non-shared part) enters a powered down more quiescent state and performs no processing. In some embodiments, instead of simply powering down the processor that has relinquished control of execution, the clock signal to the non-active one of the first processing circuitry and the second processing circuitry is stopped (e.g. gated). This reduces dynamic power consumption.

The hybrid uni-processor of FIG. 5 differs from a conventional multi-processor system at least because although there are two sets of processing hardware (high performance and high efficiency) these together form a uni-processing environment in which there can be no substantially contemporaneous processing of different instruction streams on the first hybrid processing unit and the second hybrid processing unit. In the systems illustrated by FIG. 4A and FIG. 4B, in each case the operating system is required to have knowledge whether it is operating on either a uni-processing environment (in the case of FIG. 4A) or in a multiprocessing environment (in the case of FIG. 4B).

Figure 6:
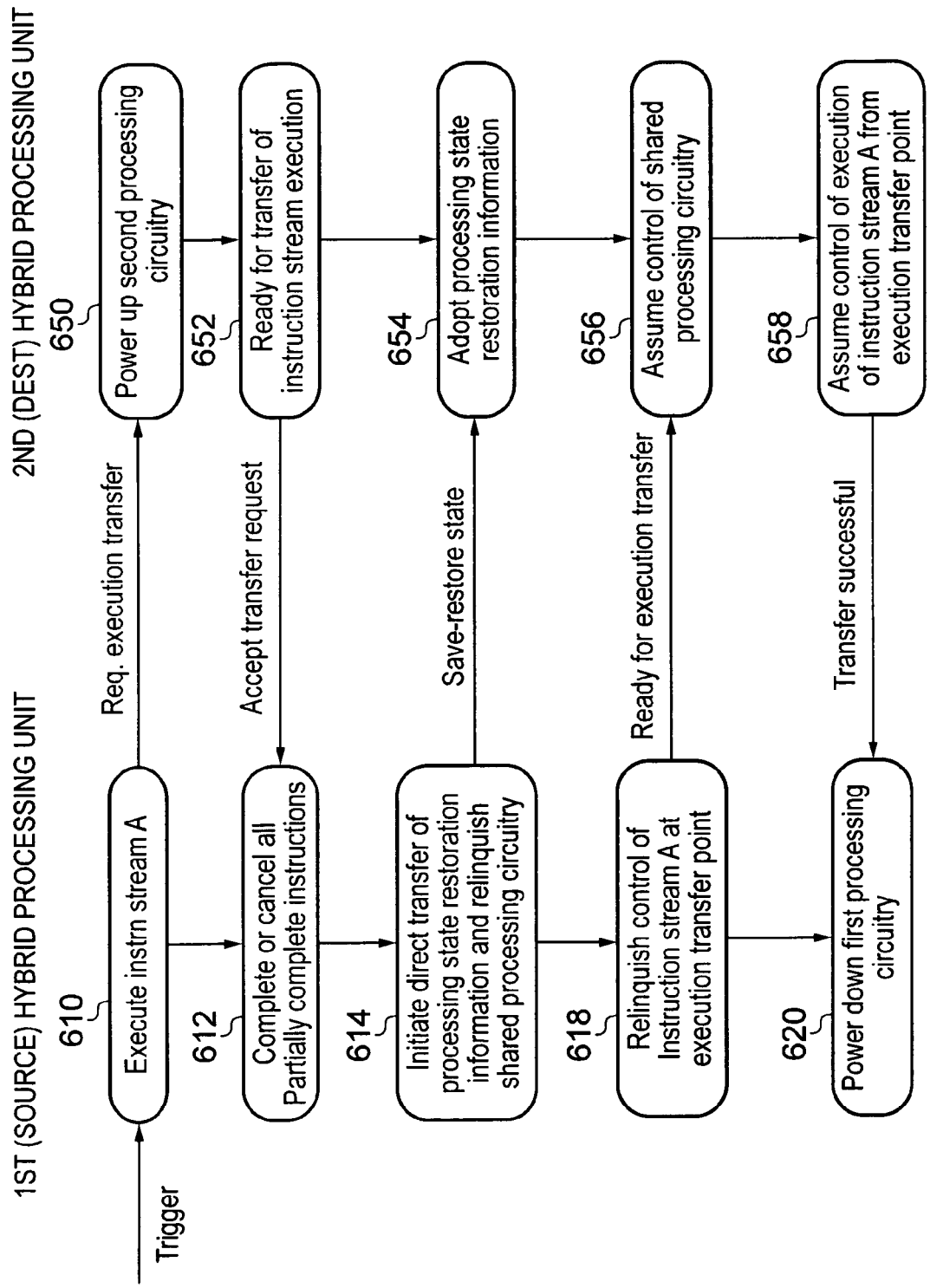
FIG. 6 is a flow chart that schematically illustrates how execution of a single instruction stream is transferred from a source hybrid processing unit to a destination hybrid processing unit.

FIG. 6 is a flow chart that schematically illustrates how execution of a single processing stream in the uni-processing environment according to embodiments of the invention is transferred between a first (source) hybrid processing unit and a second (destination) hybrid processing unit. In each case, the hybrid processing unit is formed from one or the other of the high performance processing circuitry 120 and the high efficiency processing circuitry 140 of FIG. 1 in addition to the shared processing circuitry 160.

The process begins at stage 610 when the source hybrid processing unit that is executing instruction stream A receives a trigger (hardware or software based) for transfer of execution of the single instruction stream. In response to the trigger, the first hybrid processing unit sends a request to the processing circuitry of the second hybrid processing unit (typically the non-shared processing circuitry) to power up the destination processing circuitry corresponding to the destination hybrid processing unit.

Then on the side of the destination hybrid processor unit the process proceeds to stage 652 where the powered up second processing circuitry becomes ready for transfer of the instruction stream execution and sends and accept signal accepting the transfer request received from the source hybrid processor unit. The source hybrid processing unit receives the accept transfer request at stage 612 and. Responds by completing or cancelling all partially complete instructions Next, on the source hybrid processing unit side, the process proceeds to stage 614 where the source hybrid processing unit initiates direct transfer of at least a portion of the processing state restoration information via the execution flow transfer circuitry 170. Also at stage 614, the source hybrid processing unit relinquishes control of the shared processing circuitry. On the side of the destination hybrid processing unit, the processing state restoration information is received at stage 654, just prior to the destination hybrid processing unit assuming control of the shared processing circuitry at stage 656.

On the side of the source hybrid processing unit, after the direct transfer of the processing state restoration information has occurred at 614, the process proceeds to stage 618 where the source hybrid processing unit relinquishes control of the instruction stream at the execution transfer point and signals to the destination hybrid processor unit that everything is ready on the source side for transfer of execution of the instruction stream.

In response to the ready signal output by the source hybrid processing unit, the destination hybrid processing unit assumes control of the shared processing circuitry at stage 656 and subsequently assumes full control of execution of instruction stream A starting from the execution transfer point. At stage 658, the destination hybrid processing unit signals back to the source processing hybrid unit that the execution transfer has successfully resumed, whereupon the source hybrid processing unit powers down the associated non-shared processing circuitry corresponding to either the high performance processing circuitry 120 or the high efficiency processing circuitry 140 of FIG. 1. Note that when the destination hybrid processing unit assumes control of the shared processing circuitry at stage 656 it automatically has access to that part of the processing state restoration information that has been stored by the non-shared processing circuitry of the source hybrid processing unit prior to the transfer of execution.

Figure 7:
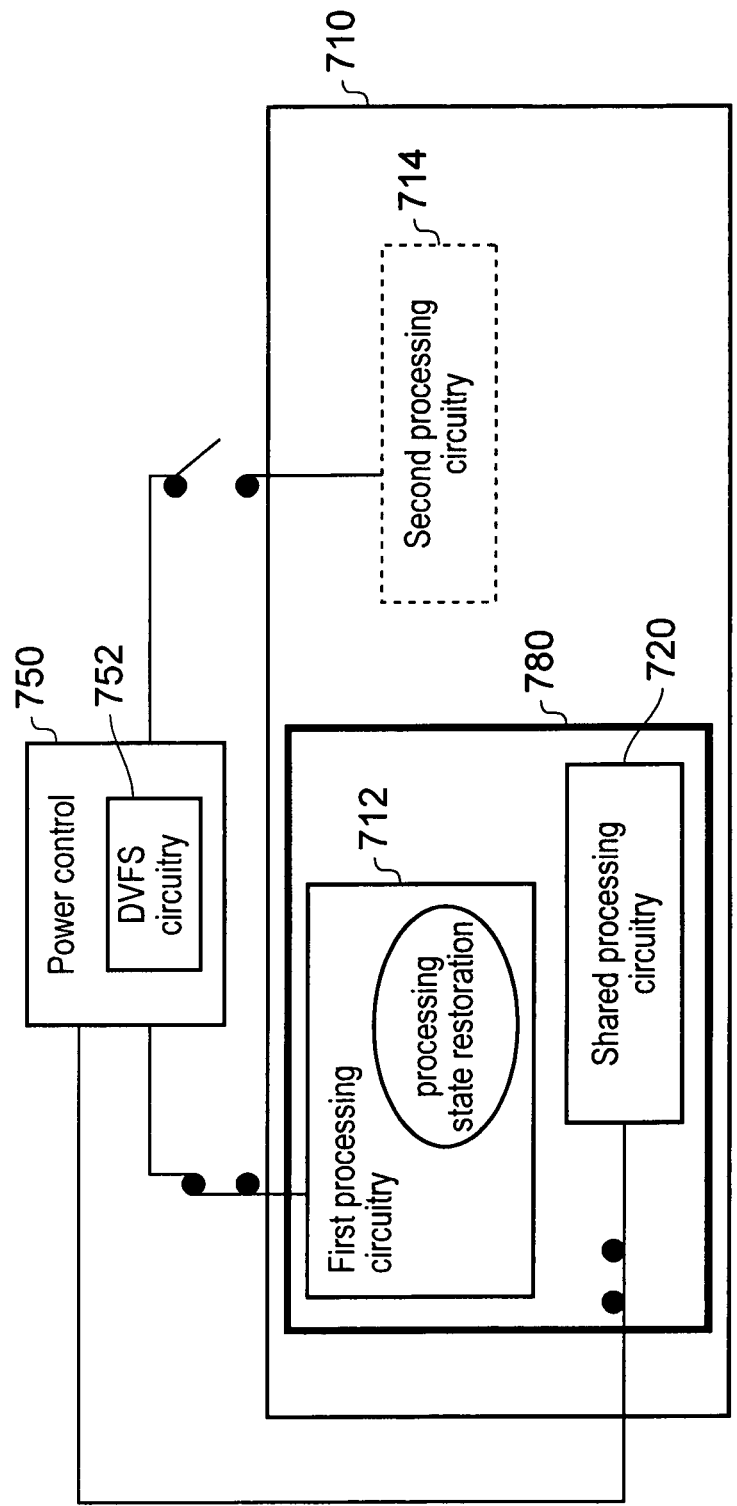
FIG. 7 schematically illustrates how first processing circuitry and shared processing circuitry operate together to execute a single instruction stream.

FIG. 7 schematically illustrates a data processing apparatus according to an embodiment of the present invention, illustrating an operational state where the first processing circuitry and shared processing circuitry have control of execution of the single instruction stream. The arrangement of FIG. 7 comprises data processing having hardware 710 comprising first processing circuitry 712 second processing circuitry 714 and shared processing circuitry 720. The arrangement further comprises power control circuitry 750 incorporating dynamic voltage and frequency scaling (DVFS) circuitry 752. In FIG. 7, the box 780 represents the source hybrid processing circuitry which is formed from the combination of the first processing circuitry 712 and the shared processing circuitry 720.

The power control circuitry 750, is providing full power to the first processing circuitry and to the shared processing circuitry via the switches 756 and 758, but because the second processing circuitry 714 is not active at the time represented by FIG. 7, the switch 759 connecting the power control circuitry 750 to the second processing circuitry 714 is open. In the embodiment of FIG. 1, the voltages of operation of the high performance circuitry 120, the high efficiency processing circuitry 140 and the shared processing circuitry 160 are substantially fixed. However, in the embodiments of FIG. 7 and FIG. 8, the power control circuitry 750 has the capacity to independently perform dynamic voltage and frequency scaling of each of (i) the first processing circuitry 712; (ii) the second processing circuitry 714; and (iii) the shared processing circuitry 720.

The DVFS circuitry 752 provides an extra mechanism to deal with the different power-performance modes that can be required by application software. Many program applications are power-constrained applications that require relatively little processor performance for the majority of time that they are executing, but periodically and somewhat transiently require relatively higher performance levels for short periods of time. The DVFS circuitry 752 enables the performance of the processing circuitry i.e. the first processing circuitry 712, the second processing circuitry 714 and the shared processing circuitry 720 to be tailored to the demands of the particular processing workload being serviced and thus allows power to be saved when maximum performance is not required.

In the system of FIG. 7, a lower energy consumption processing mode of the apparatus can be entered by causing the DVFS circuitry 752 to reduce voltage to one or more of the processing circuits 712, 714 and 720 so that less power is consumed. Reducing the voltage also makes the transistors switch more slowly so that the frequency of the processor clock should be correspondingly reduced. The DVFS circuitry 752 of FIG. 7 is a simple circuitry that has one full voltage/frequency performance point and a single lower voltage/frequency performance point. However, in an alternative embodiment, a plurality of different performance points or even a continuum of voltages and frequencies are provided (within a predetermined range).

The arrangement of FIG. 7 also comprises within the DVFS 752, circuitry to level-shift and re-synchronise signals crossing between the voltage domains corresponding to the first processing circuitry, the second processing circuitry and the shared processing circuitry. Note that the operating system 772 is a uni-processing operating system that sees the single processor having two operating modes: a first operating mode corresponding to the first processing circuitry 712 and the shared processing circuitry 720 collectively having execution control; and a second processing mode corresponding to the second processing circuitry 714 and the shared processing circuitry 720 having shared execution control of the single instruction stream.

Figure 9:
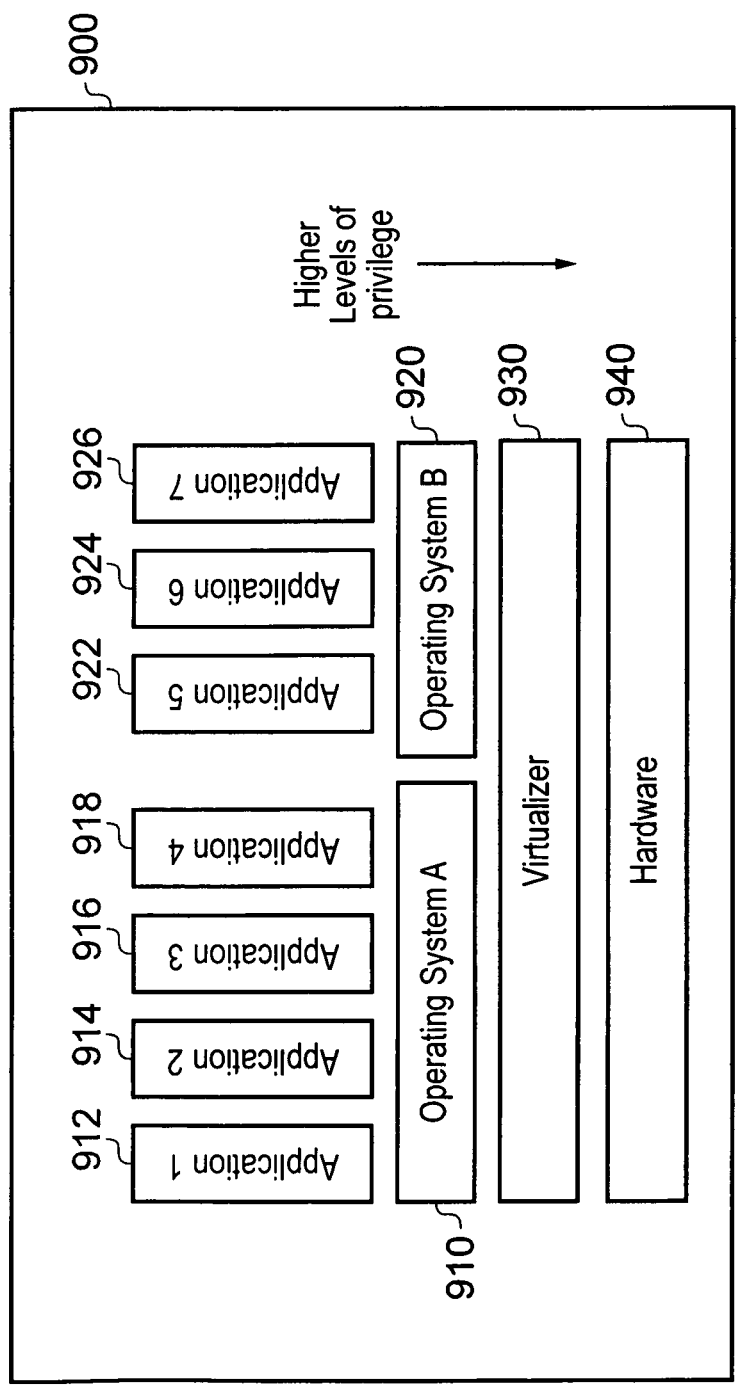
FIG. 9 schematically illustrates a relationship between hardware, virtualizer software, operating system software and application software.

In the system of FIG. 7, the virtualiser software (see FIG. 9) hides the details of configuration of the first processing circuitry and the second processing circuitry from the operating system (see FIG. 9). This means that the virtualiser and not the operating system is used to manage migration (switching) of execution of the single instruction stream between the first processing circuitry 712 and the second processing circuitry 714. Thus the execution stream migration can be triggered directly via a user-mode program instruction without having to enter the operating system. Entering the operating system could in principle take up to several thousand processing cycles and this could have an impact on the time taken to switch between execution on the source hybrid processing unit and the second hybrid processing unit, but the use of the virtualiser expedites switching of execution control. A transfer of execution flow between the first processing circuitry 712 and second processing circuitry 714 can be triggered by an application program itself. For example, an application program executing on higher efficiency processing circuitry can trigger and execution flow switch to execution on the higher performance processing circuitry in the event of a jump into the operating system or a jump into the virtualisation software.

Furthermore, the transfer of execution of the instruction stream can be triggered and performed purely in hardware without any software support, for example when the battery charge level falls below a predetermined threshold which triggers the data processing apparatus to switch from executing the instruction stream on high performance processing circuitry to high efficiency processing circuitry.

Figure 8:
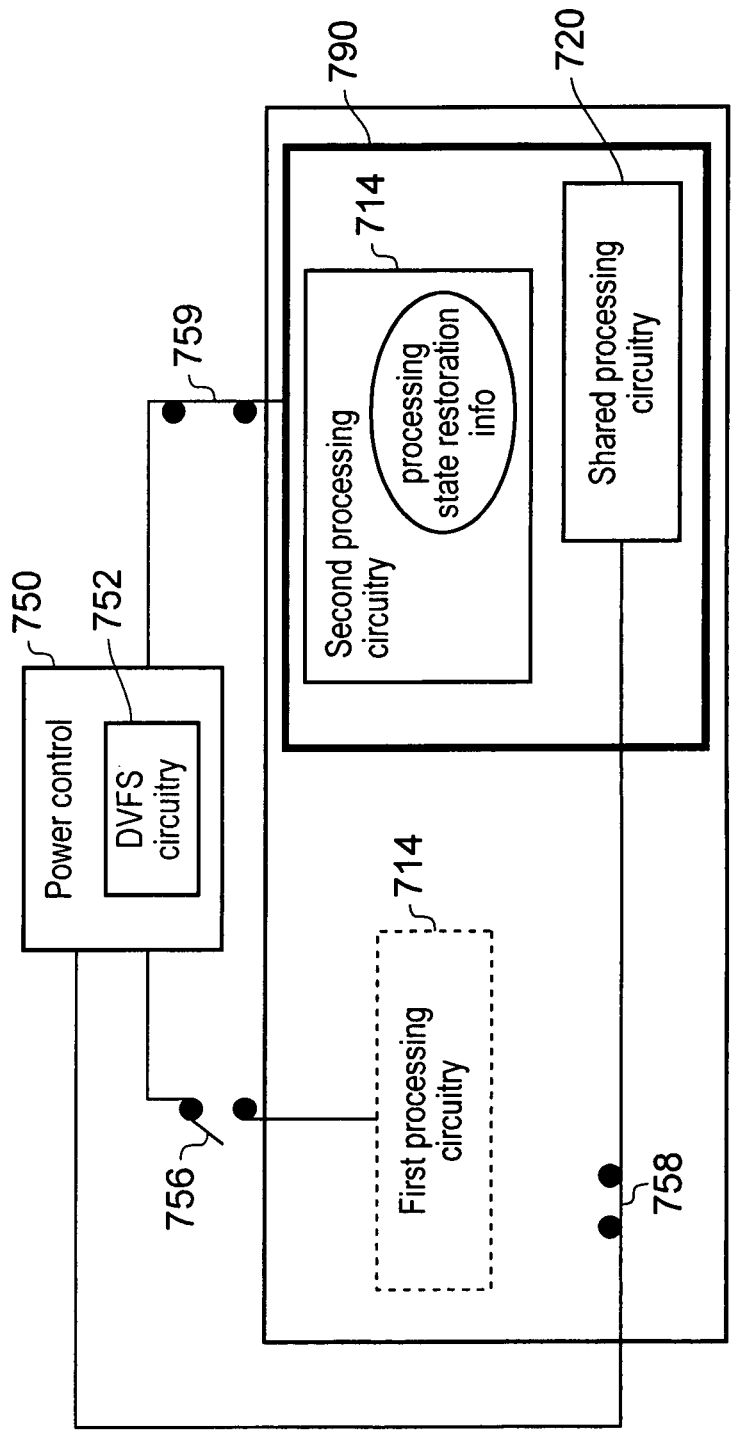
FIG. 8 is a data processing apparatus that schematically illustrates how the second processing circuitry and the shared processing circuitry operate together to form a second hybrid processing unit in the same system as illustrated in FIG. 7.

FIG. 8 schematically illustrates the power control configuration of an apparatus having identical hardware and software to the apparatus illustrated in FIG. 7, but represents the system after execution control has been transferred from the first processing circuitry to the second processing circuitry. In this case, the second processing circuitry 714 together with the shared processing circuitry 720 form the second or destination hybrid processing unit so that the power controller switches 759 and 758 are both closed (representing power being supplied). The power control switch 756 connecting the power control circuitry 750 to the first processing circuitry 712 is open. Clearly, the first processing circuitry is powered down and execution control has been assumed by the second processing circuitry 714.

The second processing circuitry 714 can be operating at either the high performance operating point or the lower performance operating point as dictated by the DVFS circuitry 752. In the arrangement of FIG. 8, the workload comprising the operating system and the two processing applications (see FIG. 9) is being performed by the second hybrid processing unit.

FIG. 9 schematically illustrates relationships between processing hardware, virtualizer software, operating system software and application software according to an embodiment of the present invention. The processing system 900 comprises: a first operating system 910 arranged to run one or more of a first application program 912, a second application program 914, a third application program 916 and a fourth application program 918. The processing system 900 further comprises a second operating system 920 on which one or more of a fifth program application 922, a sixth program application 924 and a seventh program application 926 are arranged to run. Both the first and second operating system 910, 920 and all seven program applications 912, 914, 916, 918, 922, 924, 926 run on processing hardware 940 through the intermediary of a virtualizer 930. The virtualizer 930 is software that runs directly on the processing hardware 940. The applications 912, 914, 916, 918, 922, 924, 926 run at a lower level of privilege than the operating systems 910, 920. The operating systems 910, 920 run at a lower level of privilege than the virtualizer 930.

The processing hardware 940 can be considered to collectively represent all of the processing circuitry 110 of the FIG. 1 embodiment. In this particular example, the first operating system 910 and the second operating system 920 can both run on either the high performance processing circuitry 120 or the high efficiency processing circuitry 140. The virtualizer 930 enables multiple operating systems to be run on the hardware 940. The virtualizer 930 is used to mask events where execution of the single instruction stream is switched between the high performance processing circuitry 120 and the high efficiency processing circuitry 140 of FIG. 1 so that the switch of execution flow control is transparent to the operating systems 910, 920 and all applications running on the operating systems.

Essentially, the virtualizer 930 hides details of the configuration of the high performance processing circuitry 120 and the high efficiency processing circuitry 140 from the operating systems 910, 920 and the virtualizer manages migration of the single instruction stream between the two sets of processing circuitry 120, 140. This means that migration of the single execution stream can be triggered directly via a user-mode program instruction without having to enter the code of any operating system 910, 920. Avoiding entering the operating system is likely to expedite switching of processing the execution stream relative to embodiments where the operating system 910, 920 is entered to effect the switch because entering the operating system could take up to several thousand processing cycles.

Figure 10:
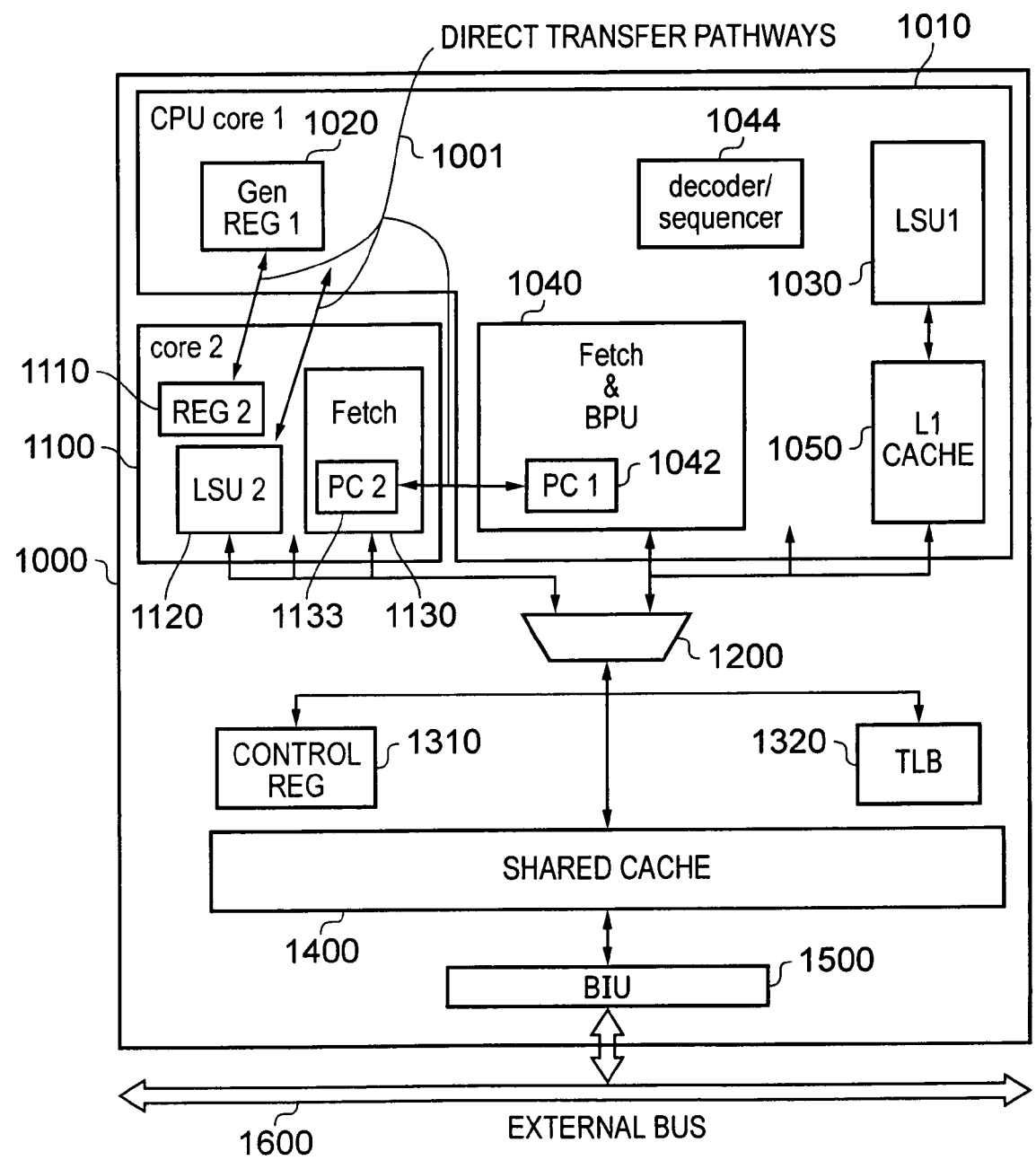
FIG. 10 schematically illustrates a data processing apparatus according to an embodiment of the present invention in which there are both first and second sets of processing circuitry and the shared processing circuitry comprises a shared cache, shared control registers and a shared TLB.

FIG. 10 schematically illustrates a data processing apparatus according to an embodiment of the present invention in which the shared processing circuitry comprises a shared cache that forms an L1 cache for one set of non-shared processing circuitry and an L2 cache for a further set of non-shared processing circuitry. The data processing apparatus 1000 comprises: first processing circuitry 1010 corresponding to a high performance central processing unit (CPU) core comprising an out-of-order, three-way issue super-scalar CPU core with thirteen pipeline stages.

The high performance CPU core 1010 comprises: a general purpose register file 1020 with eight read ports and three write ports; a first load store unit 1030; an instruction fetch and branch prediction unit 10410 comprising a first program counter for keeping track of the currently executing instruction when the high performance CPU core has control of the execution of the single instruction stream; and an instruction decoder/sequencer 1044. The high performance CPU core 1010 further comprises: a level one cache 1050 that is in bi-directional communication with the first load storage unit 1030 to store instructions and/or data extracted from and en route to a main memory (not shown).

The data processing apparatus 1000 also comprises a second set of processing circuitry corresponding to a low power CPU core 1100 that is low power relative to the high performance CPU core 1010 and also has relatively lower performance. The low power CPU core 1100 is an in-order, single issue CPU core with three pipeline stages. The reduced number of pipeline stages relative to the high performance CPU core 1010, the single issue rather than the three-way issue of instructions and the in-order execution rather than out-of-order execution of program instructions contribute to the lower power consumption and lower relative performance.

The low power CPU core 1100 comprises a second register file 1110 corresponding to a general purpose register file with two read ports and one write port. The low power CPU core 1100 also comprises a second load store unit 1020 that is simpler than the first load storage unit 1030 and a second instruction fetch unit 1130 that is relatively simple in comparison to the first instruction fetch unit 1040 of the high performance CPU core 1010. The second instruction set unit 1030 comprises a second program counter 1033 that is used to keep track of a currently executing instruction whilst the flow of execution is being controlled by the low performance CPU core 1100 rather than the high performance CPU core 1010.

The data processing apparatus 1000 is provided with a plurality of direct transfer pathways 1001 for transferring data directly between the high performance CPU core 1010 and the low power CPU core 1100. The plurality of direct transfer pathways 1001 include: a direct transfer pathway between the first general register file 1020 and the second general register file 1010; a further direct transfer pathway between the first program counter 1042 and the second program counter 1133; and a further direct transfer pathway that enables direct by bi-rectional communication between the high performance CPU core 1010 and the low power CPU core 1100. These direct transfer pathways 1001 enable at least a portion of the processing state restoration information required for transferring execution between the high performance CPU core 1010 and the low power CPU core 1100. The directly transferred portion of the processing state restoration information need not be pushed out to external (main) memory or stored in buffers or caches prior to transfer between the two CPU cores 1010, 1100.

In this particular embodiment, the shared processing circuitry is accessible to both the high performance CPU core 1010 and the low power CPU core 1110 via the multiplexer 1200. The shared processing circuitry comprises a set of control registers 1310 including flag registers, mode registers and configuration registers and also a TLB 1320 for providing a mapping between virtual memory addresses and physical memory addresses. The shared processing circuitry further comprises a shared cache 1400 and a bus interface unit 1500. The bus interface unit 1500 enables communication of data to and from an external bus 1600.

Since the high performance CPU core 1100 already has the L1 cache 1050, the shared cache 1400 serves as a level two cache for the high performance CPU core 1010 but also serves as a level one cache for the low power CPU core 1100, which does not have its own non-shared level one cache. In the case that the high performance CPU core 1100 L1 caches uses a write-back cache policy the cache should be cleaned to push any modified entries to L2 as part of the instruction stream transfer process. This would be necessary anyway in order to power down the high performance CPU core 1100. It can be avoided by using a write-through L1 cache policy that does not require cleaning. Write-through caches can sometimes have performance and power disadvantages. Since the power efficient core does not have an L1 cache there is no need to perform a cache clean and this may reduce the time needed to switch into high-performance processing. In alternative embodiments both high performance and low power cores have an L1 cache. For example, the low power core having a power optimized L1 cache and the high performance core having a performance optimized L1 cache.

A direct transfer pathway 1001 serves to transfer any non-shared performance critical state between the high performance CPU core 1010 and the low power CPU core 1100 upon a switch of the instruction stream execution i.e. a transfer of execution between the two CPU cores. In the event of a transfer of flow of execution from the high performance CPU core 1010 to the low power CPU core 1100, the non-shared L1 cache 1050 of the high performance CPU core 1010 remains powered during the execution flow transfer and is cleaned as part of the transfer and circuitry is provided within the data processing apparatus 1000 that allows data and instructions required by the instruction stream newly transferred and executing on the low power CPU core to be obtained from the non-shared L1 cache 1050 of the high performance CPU core 1010 (source hybrid processing unit). The data and instructions obtained in this way from the L1 cache 1050 are then cached in the destination hybrid processing unit, i.e. in this case the low power CPU core 1100 or the shared processing circuitry. This improves the efficiency of the system by reducing the likelihood of having to retrieve data from external memory when execution of the transferred single instruction stream that has been suspended on the source hybrid processing unit is resumed on the destination processing hybrid unit.

The data processing apparatus 1000 corresponds to a uni-processing environment in which only one of the high performance CPU core 1010 and the low power CPU core 1100 has overall control of execution of the single instruction stream at any one time.

In the data processing apparatus 1000 of FIG. 10, the high performance CPU 1010 corresponds to a high-performance processing region of a single integrated circuit whilst the low power CPU core 1100 corresponds to an energy-efficient processing region of the same integrated circuit. Thus the processing circuitry associated with the high performance processing region 1010 are physically close to each other on the integrated circuit and similarly the circuitry associated with the energy efficient processing region 1100 are physically close to each other on the integrated circuit, rather than being distributed across the whole area of the integrated circuit (core processor). Although there is some duplication of the processing circuitry by providing, for example, a first load store unit 1030 and the second load store unit 1020 and a first fetch unit 1040 and a second fetch unit 1030, this duplication is mitigated by the fact that there are typically high overheads and integrating unit-level clock gating or power-switching and input/output signal clamping in a fine grain distributed manner across a large processor (integrated circuit). The power-switching has an area overhead and the signal clamping can lengthen critical paths thus reducing the peak clock frequency of the processor. Thus although there is the above mentioned duplication of processing circuitry by provision of the two different CPU cores 1010, 1100 on the same integrated circuit in the embodiment of FIG. 10 the clock gating or power-gating and input/output signal clamping is simplified relative to having more distributed circuitry and the critical paths in the high performance processing region 1010 are not impacted as much by the energy efficient mode made possible by the low power CPU core 1100. An additional benefit is in reducing the distance that many signals must travel when the execution is being performed by the low power CPU core 1100 in a low-energy mode and this improves the energy efficiency.

Figure 11:
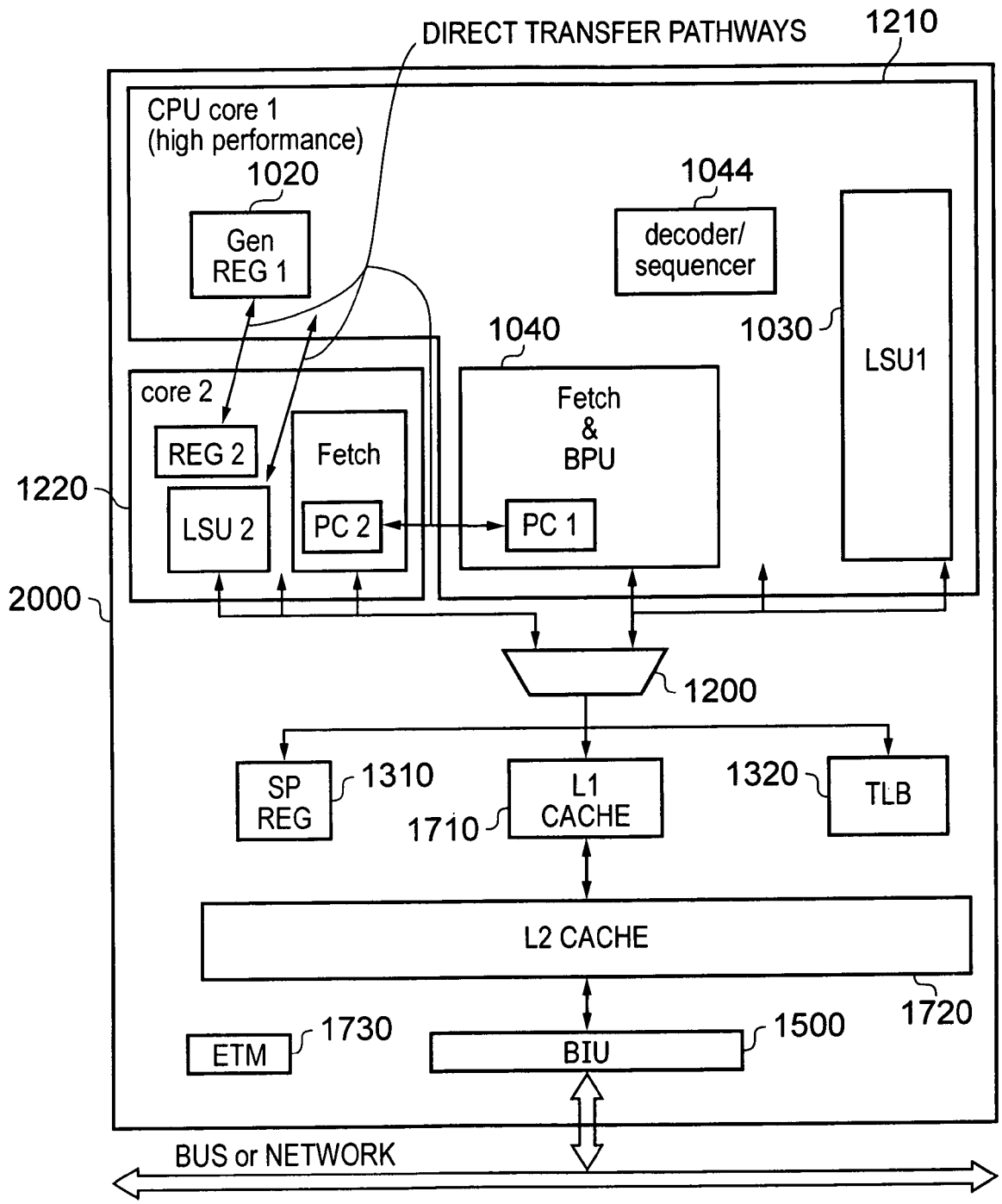
FIG. 11 schematically illustrates a data processing apparatus according to an embodiment in which the shared processing circuitry comprises control registers, L1 cache, L2 cache, TLB and bus interface unit.

FIG. 11 schematically illustrates data processing apparatus according to an embodiment of the present invention in which a high performance CPU core and a low power CPU core share a set of special purpose registers, a TLB, a bus interface unit and both a level one cache and a level two cache. The data processing apparatus 2000 of FIG. 11, similar to the apparatus of FIG. 10 comprises a high performance CPU core 1210 and a low power CPU core 1220 the individual components of the low power CPU core 1220 are identical to the individual components of the low power CPU core 1100 of the embodiment of FIG. 10.

The constituent circuitry of the high performance CPU core 1210 of FIG. 11 comprises an identical first general register file 1020, load store unit 1030, decoder/sequencer 1044 and set and branch point unit 1040 to the arrangement of the high performance CPU core 1010 of FIG. 10. However there is a key difference between the high performance CPU core 1210 of FIG. 11 and that of FIG. 10 in that the high performance CPU core 1210 of FIG. 11 does not have a non-shared level one cache. Instead, the shared processing circuitry comprises both a shared level one cache 1710 and a shared level two cache 1720.

The shared processing circuitry, like the embodiment of FIG. 10 further comprises a set of control registers 1310 which is a master copy of information in the special purpose registers, a shared TLB 1320 and a shared bus interface unit 1500 connecting the processor 2000 to external memory and the rest of the system in which the data processing apparatus 2000 is incorporated. The same as the case for the arrangement of the embodiment of FIG. 10, a plurality of direct transfer pathways 1001 enable direct transfer of non-shared performance critical state between the high performance CPU core 1210 and the low power CPU core 1220. The embodiment of FIG. 11 also has shared embedded trace macrocell (ETM) circuitry 1730 as part of the shared processing circuitry, which avoids the need for two separate trace units for the high performance CPU core 1210 and the low power CPU core 1220.

In yet further alternative embodiments, the program counters 1042 and 1133 could also be replaced by a shared program counter common to the high performance CPU core 1010 and the low power CPU core 1100. However, it is likely that the hardware transfer of program counter data between the non-shared portions of the circuitry has less impact on critical paths than transfer of cache data, TLB registers or special purpose register data. In order to simplify the transfer of the processing state restoration information, some embodiments drain the pipelines of the high performance CPU core 1010 and the low power CPU core 1100 to simplify the transfer of the control of the single execution stream, The draining of the pipeline typically costs only a few tens of processing cycles.

Figure 12:
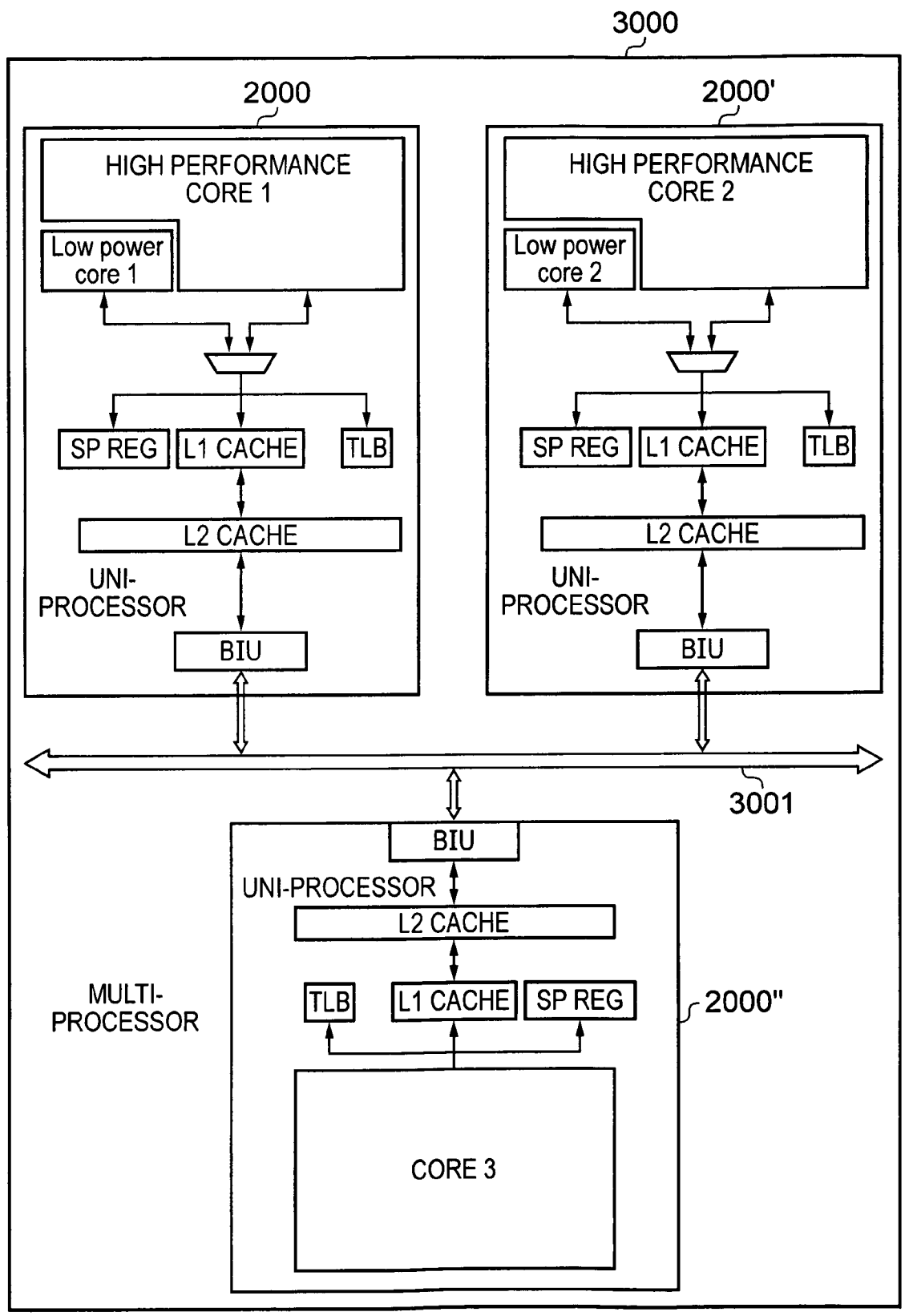
FIG. 12 is a multiprocessing data processing apparatus according to an embodiment of the present invention comprising three individual uni-processing apparatuses, two of which each have distinct sets of high-performance processing circuitry, low-performance processing circuitry and shared processing circuitry and one of which has a single set of processing circuitry.

FIG. 12 schematically illustrates a multi-processor system constructed from two separate instances of the uni-processor of the embodiment of FIG. 11 and a standard single-core processor. Thus the multiprocessing system 3000 comprises a first integrated circuit 2000 having a high performance CPU and a low power CPU and shared L1 cache and L2 cache, TLB registers and special purpose registers and bus interface unit and a further dual-core uni-processing environment 2000' as well as a single core uni-processor 2000". The three uni-processing integrated circuits 2000, 2000' and 2000" are connected via the bus 3001. Within each of the two dual-core uni-processing systems 2000, 2000' only one of the high performance CPU core and the low power CPU core can have control of execution of the single instruction stream being executed in that particular integrated circuit at any one time. The single core uniprocessor 2000" is a standard processing core where the single instruction stream runs on a single core.

Thus the multiprocessor system 3000 is constituted by three separate uni-processor systems. Thus the multiprocessor 3000 comprises a selection of separate processors 2000, 2000' and 2000" and each of the three uni-processors processes a different instruction stream. Furthermore, each individual uni-processor has the physical resources necessary to process an instruction stream without the requirement to time division multiplex and each individual processor 2000, 2000' and 2000" communicates with external memory and any other processors within the network system in which the multiprocessor is used through one or more bus or network interfaces.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus for processing data comprising:
first processing circuitry configured to operate in a first power domain;
second processing circuitry configured to operate in a second power domain different from said first power domain;
shared processing circuitry configured to operate in a shared power domain such that said first processing circuitry and said shared processing circuitry are configurable to operate together to form a first hybrid processing unit having access to an external memory and said second processing circuitry and said shared processing circuitry are configurable to operate together to form a second hybrid processing unit having access to said external memory, wherein said first hybrid processing unit and said second hybrid processing unit together comprise a uni-processing environment for executing a single instruction stream;
execution flow transfer circuitry configured to transfer execution of said single instruction stream between said first hybrid processing unit and said second hybrid processing unit at a transfer execution point, wherein said execution flow transfer comprises transfer of at least one bit of processing-state restoration information from a source one of said first hybrid processing unit and said second hybrid processing unit to a destination one of said first hybrid processing unit and said second hybrid processing unit, said processing-state restoration information being information enabling said destination hybrid processing unit to successfully resume execution of said single instruction stream from said transfer execution point;
transmission circuitry configured to provide a transmission pathway from said source hybrid processing unit to said destination hybrid processing unit for said at least one bit of processing-state restoration information and wherein said transmission pathway bypasses said external memory, wherein the at least one bit of processing-state restoration information comprises at least one of: branch predictor history information, TLB contents, micro-TLB contents and data prefetcher pattern information; and power control circuitry configured to control said shared processing circuitry to operate at a first level of power consumption when said first hybrid processing unit has control of execution of said single instruction stream and to operate at a second different level of power consumption when said second hybrid processing unit has control of execution of said single instruction stream.

2. The apparatus as claimed in claim 1, wherein said first processing circuitry and said second processing circuitry have different processing performance characteristics.

3. The apparatus as claimed in claim 2, wherein said execution flow transfer circuitry comprises the power control circuitry for independently controlling power to said first processing circuitry and said second processing circuitry such that each of said first processing circuitry and said second processing circuitry can be placed in a powered-up state in which it is ready to perform processing operations and a power-saving state in which it is awaiting activation.

4. The apparatus as claimed in claim 3, wherein said power control circuitry is configured to independently control power to said shared circuitry.

5. The apparatus as claimed in claim 3, wherein said power control circuitry is configured to switch one of said first processing circuitry and said second processing circuitry corresponding to said destination hybrid processing unit from said power-saving state to said powered-up state and to switch the other of said first processing circuitry and said second processing circuitry corresponding to said source hybrid processing unit from said powered-up state to said power-saving state as part of said execution transfer process.

6. The apparatus as claimed in claim 2, wherein said first processing circuitry and said second processing circuitry are architecturally compatible and wherein said first processing circuitry differs micro-architecturally from said second processing circuitry.

7. The apparatus as claimed in claim 6, wherein said architectural compatibility comprises compatibility of at least one of general purpose registers, control registers and instruction sets.

8. The apparatus as claimed in claim 6, wherein said micro-architectural differences between said first processing circuitry and said second processing circuitry comprise at least one of: pipeline length, instruction issue width, cache configuration, branch prediction capability and translation lookaside buffer (TLB) configuration.

9. The apparatus as claimed in claim 2, wherein one of said first processing circuitry and said second processing circuitry is higher performance processing circuitry relative to the other of said first processing circuitry and said second processing circuitry and wherein said other of said first processing circuitry and said second processing circuitry is higher efficiency processing circuitry relative to said one of said first processing circuitry and said second processing circuitry.

10. The apparatus as claimed in claim 9, wherein said apparatus is fabricated on a single integrated circuit with said higher performance processing circuitry being substantially physically localized to a first area of said integrated circuit and said higher efficiency processing circuitry being substantially physically localized to a second area of said integrated circuit and wherein said second area is different from said first area.

11. The apparatus as claimed in claim 2, wherein said shared processing circuitry comprises cache circuitry.

12. The apparatus as claimed in claim 11, wherein said shared cache circuitry comprises both level one cache circuitry and level two cache circuitry, each of said level one cache circuitry and said level two cache circuitry serving both higher performance processing circuitry and higher efficiency processing circuitry.

13. The apparatus as claimed in claim 11, wherein said shared processing circuitry comprises translation lookaside buffer (TLB) circuitry.

14. The apparatus as claimed in claim 1, comprising circuitry for stopping a clock signal to one of said first processing circuitry and said second processing circuitry that is not currently in control of execution of said single instruction stream.

15. The apparatus as claimed in claim 1, wherein said shared processing circuitry comprises at least one of: cache circuitry, translation lookaside buffer circuitry, special purpose registers, bus interface circuitry, bus pins and trace circuitry.

16. The apparatus as claimed in claim 1, wherein each of said first processing circuitry and said second processing circuitry comprises at least one of: a program counter, general purpose registers, branch prediction circuitry, decoding/sequencing circuitry, an execution datapath and load/store circuitry.

17. The apparatus as claimed in claim 1, wherein said transmission pathway comprises a dedicated signal path between said first processing circuitry and said second processing circuitry.

18. The apparatus as claimed in claim 17, wherein said transmission circuitry is configured to use a plurality of clock cycles to perform the transfer over said transmission pathway.

19. The apparatus as claimed in claim 1, wherein said at least one bit of processing-state restoration information comprises at least one of: a program counter and at least a subset of general purpose register contents of said source hybrid processing unit at said transfer execution point.

20. The apparatus as claimed in claim 1, wherein:
at least said source hybrid processing unit comprises an associated non-shared cache as part of one of said first processing circuitry and said second processing circuitry corresponding to said source hybrid processing unit, said associated non-shared cache being separate from said shared processing circuitry.

21. The apparatus as claimed in claim 1, wherein said execution flow transfer circuitry is configured to initiate said transfer of execution of said single instruction stream from said source hybrid processing unit to said destination hybrid processing unit in response to a hardware trigger such that said transfer is functionally transparent to an operating system and software executing on said data processing apparatus.

22. The apparatus as claimed in claim 21, wherein said hardware trigger is at least one of: a temperature sensor, a series of cache misses, initiation of a hardware page table walk, processing circuitry entering a polling state and processing circuitry entering a wait-for-interrupt state.

23. The apparatus as claimed in claim 1, wherein said execution flow transfer circuitry is configured to initiate said transfer of execution of said single instruction stream from said source hybrid processing unit to said destination hybrid processing unit in response to an external trigger.

24. The apparatus as claimed in claim 23, wherein said external trigger is configured to receive a trigger stimulus from at least one of a temperature monitor and a power controller.

25. The apparatus as claimed in claim 1, wherein said execution flow transfer circuitry is configured to initiate said transfer of execution of said single instruction stream from said source hybrid processing unit to said destination hybrid processing unit in response to a software trigger.

26. The apparatus as claimed in claim 25, wherein said software trigger comprises a processor instruction.

27. The apparatus as claimed in claim 1, comprising performance-level varying circuitry configured to vary a processing performance level of at least one of said first hybrid processing unit and said second hybrid processing unit.

28. The apparatus as claimed in claim 27, wherein said performance-level varying circuitry is configured to perform dynamic voltage and frequency scaling of processing performance of at least one of said first hybrid processing unit and said second hybrid processing unit by varying at least one of: a voltage of said first power domain; a voltage of said second power domain; a voltage of said shared power domain; a frequency of operation of said first processing circuitry; a frequency of operation of said second processing circuitry and a frequency of operation of said shared processing circuitry.

29. A multi-processing data processing system comprising a plurality of uni-processing data processing apparatus and a bus providing a communication path between said plurality of uni-processing data processing apparatus, said multi-processing data processing system being configured to support concurrent execution a plurality of instruction streams in processing hardware, wherein said plurality of uni-processing data processing apparatus comprises at least one of the data processing apparatus as claimed in claim 1.

30. An apparatus for processing data comprising:
first processing circuitry configured to operate in a first power domain;
second processing circuitry configured to operate in a second power domain different from said first power domain;
shared processing circuitry configured to operate in a shared power domain such that said first processing circuitry and said shared processing circuitry are configurable to operate together to form a first hybrid processing unit having access to an external memory and said second processing circuitry and said shared processing circuitry are configurable to operate together to form a second hybrid processing unit having access to said external memory, wherein said first hybrid processing unit and said second hybrid processing unit together comprise a uni-processing environment for executing a single instruction stream;
execution flow transfer circuit configured to transfer execution of said single instruction stream between said first hybrid processing unit and said second hybrid processing unit at a transfer execution point, wherein said execution flow transfer comprises transfer of at least one bit of processing-state restoration information from a source one of said first hybrid processing unit and said second hybrid processing unit to a destination one of said first hybrid processing unit and said second hybrid processing unit said processing-state restoration information being information enabling said destination hybrid processing unit to successfully resume execution of said single instruction stream from said transfer execution point:
transmission circuitry configured to provide a transmission pathway from said source hybrid processing unit to said destination hybrid processing unit for said at least one bit of processing-state restoration information and wherein said transmission pathway bypasses said external memory, wherein the at least one bit of processing-state restoration information comprises at least one of: branch predictor history information TLB contents micro-TLB contents and data prefetcher pattern information, wherein said apparatus is fabricated on a single integrated circuit and wherein said shared power domain is configured to operate at a different voltage from voltages corresponding to each of said first power domain and said second power domain.

31. An apparatus for processing data comprising:
first processing circuitry configured to operate in a first power domain;
second processing circuitry configured to operate in a second power domain different from said first power domain;
shared processing circuitry configured to operate in a shared power domain such that said first processing circuitry and said shared processing circuitry are configurable to operate together to form a first hybrid processing unit having access to an external memory and said second processing circuitry and said shared processing circuitry are configurable to operate together to form a second hybrid processing unit having access to said external memory, wherein said first hybrid processing unit and said second hybrid processing unit together comprise a uni-processing environment for executing a single instruction stream;
execution flow transfer circuitry for transferring execution of said single instruction stream between said first hybrid processing unit and said second hybrid processing unit at a transfer execution point, wherein said execution flow transfer comprises transfer of at least one bit of processing-state restoration information from a source one of said first hybrid processing unit and said second hybrid processing unit to a destination one of said first hybrid processing unit and said second hybrid processing unit, said processing-state restoration information being information enabling said destination hybrid processing unit to successfully resume execution of said single instruction stream from said transfer execution point;
wherein said first processing circuitry and said second processing circuitry have different processing performance characteristics;
said shared processing circuitry comprises cache circuitry; and
said shared cache circuitry is configured to serve as a level two cache for higher performance processing circuitry and configured to serve as a level one cache for higher efficiency processing circuitry.

32. An apparatus for processing data comprising:
first processing circuitry configured to operate in a first power domain;
second processing circuitry configured to operate in a second power domain different from said first power domain;
shared processing circuitry configured to operate in a shared power domain such that said first processing circuitry and said shared processing circuitry are configurable to operate together to form a first hybrid processing unit having access to an external memory and said second processing circuitry and said shared processing circuitry are configurable to operate together to form a second hybrid processing unit having access to said external memory wherein said first hybrid processing unit and said second hybrid processing unit together comprise a uni-processing environment for executing a single instruction stream:

execution flow transfer circuitry configured to transfer execution of said single instruction stream between said first hybrid processing unit and said second hybrid processing unit at a transfer execution point, wherein said execution flow transfer comprises transfer of at least one bit of processing-state restoration information from a source one of said first hybrid processing unit and said second hybrid processing unit to a destination one of said first hybrid processing unit and said second hybrid processing unit, said processing-state restoration information being information enabling said destination hybrid processing unit to successfully resume execution of said single instruction stream from said transfer execution point; and transmission circuit I configured to provide a transmission pathway from said source hybrid processing unit to said destination hybrid processing unit for said at least one bit of processing-state restoration information and wherein said transmission pathway bypasses said external memory, wherein the at least one bit of processing-state restoration information comprises at least one of: branch predictor history information, TLB contents, micro-TLB contents and data prefetcher pattern information, wherein said execution flow transfer circuitry is configured to initiate said transfer of execution of said single instruction stream from said source hybrid processing unit to said destination hybrid processing unit in response to a software trigger, wherein said software trigger comprises one of a write data access to a special purpose register and a write data access to a specific address in a memory map.

33. An apparatus for processing data comprising:

first processing circuitry configured to operate in a first power domain;

second processing circuitry configured to operate in a second power domain different from said first power domain;

shared processing circuitry configured to operate in a shared power domain such that said first processing circuitry and said shared processing circuitry are configurable to operate together to form a first hybrid processing unit having access to an external memory and said second processing circuitry and said shared processing circuitry are configurable to operate together to form a second hybrid processing unit having access to said external memory, wherein said first hybrid processing unit and said second hybrid processing unit together comprise a uni-processing environment for executing a single instruction stream;

execution flow transfer circuitry for transferring execution of said single instruction stream between said first hybrid processing unit and said second hybrid processing unit at a transfer execution point, wherein said execution flow transfer comprises transfer of at least one bit of processing-state restoration information from a source one of said first hybrid processing unit and said second hybrid processing unit to a destination one of said first hybrid processing unit and said second hybrid processing unit, said processing-state restoration information being information enabling said destination hybrid processing unit to successfully resume execution of said single instruction stream from said transfer execution point, wherein said execution flow transfer circuitry is configured to initiate said transfer of execution of said single instruction stream from said source hybrid processing unit to said destination hybrid processing unit in response to a software trigger; and virtualisation software running on said data processing apparatus provides said software trigger, said virtualisation software serving to mask configuration control information specific to said first processing circuitry and said second processing circuitry from an operating system executing on said data processing apparatus such that said transfer of execution of said single instruction stream is transparent to both an operating system and one or more applications executing on said data processing apparatus at a time corresponding to said transfer execution point, wherein one of said first processing circuitry and said second processing circuitry is higher performance processing circuitry relative to the other of said first processing circuitry and said second processing circuitry and wherein said other of said first processing circuitry and said second processing circuitry is higher efficiency processing circuitry relative to said one of said first processing circuitry and said second processing circuitry and wherein an exception or jump into said operating system or said virtualisation software from an application executing on said higher efficiency processing circuitry causes an automatic transfer of execution of said application to said higher performance processing circuitry.

34. An apparatus for processing data comprising:

first means for processing configured to operate in a first power domain;

second means for processing configured to operate in a second power domain different from said first power domain;

means for shared processing configured to operate in a shared power domain such that said first means for processing and said means for shared processing are configurable to operate together to form a first means for hybrid processing having access to an external memory and said second means for processing and said means for shared processing are configurable to operate together to form a second means for hybrid processing having access to said external memory, wherein said first means for hybrid processing and said second means for hybrid processing together comprise a uni-processing environment for executing a single instruction stream;

means for execution flow transfer for transferring execution of said single instruction stream between said first means for hybrid processing and said second means for hybrid processing at a transfer execution point, wherein said execution flow transfer comprises transfer of at least one bit of processing-state restoration information from a source one of said first means for hybrid processing and said second means for hybrid processing to a destination one of said first means for hybrid processing and said second means for hybrid processing, said processing-state restoration information being information enabling said destination means for hybrid processing to successfully resume execution of said single instruction stream from said transfer execution point;

transmission means for providing a transmission pathway from said source hybrid processing unit to said destination hybrid processing unit for said at least one bit of processing-state restoration information and wherein said transmission pathway bypasses said external memory, wherein the at least one bit of processing-state restoration information comprises at least one of: branch predictor history information, TLB contents, micro-TLB contents and data prefetcher pattern information; and power control means for controlling said shared processing means to operate at a first level of power consumption when said first hybrid processing means has control of execution of said single instruction stream and to operate at a second different level of power consumption when said second hybrid processing means has control of execution of said single instruction stream.

35. A data processing method comprising the steps of:

operating first processing circuitry in a first power domain;

operating second processing circuitry in a second power domain different from said first power domain;

operating shared processing circuitry in a shared power domain and forming a first hybrid processing unit by operating said first processing circuitry and said shared processing circuitry together, said first hybrid processing unit having access to an external memory;

forming a second hybrid processing unit by operating said second processing circuitry and said shared processing circuitry together, said second hybrid processing unit having access to said external memory;

providing a uni-processing environment for executing a single instruction stream, said uni-processing environment comprising said first hybrid processing unit and said second hybrid processing unit together;

transferring execution of said single instruction stream between said first hybrid processing unit and said second hybrid processing unit at a transfer execution point using transfer execution circuitry, wherein said execution flow transfer comprises transfer of at least one bit of processing-state restoration information from a source one of said first hybrid processing unit and said second hybrid processing unit to a destination one of said first hybrid processing unit and said second hybrid processing unit, said processing-state restoration information being information enabling said destination hybrid processing unit to successfully resume execution of said single instruction stream from said transfer execution point;

transmitting said at least one bit of processing-state restoration information via a transmission pathway from said source hybrid processing unit to said destination hybrid processing unit, wherein said transmission pathway bypasses said external memory, wherein the at least one bit of processing-state restoration information comprises at least one of: branch predictor history information, TLB contents, micro-TLB contents and data prefetcher pattern information; and controlling said shared processing circuitry to operate at a first level of power consumption when said first hybrid processing unit has control of execution of said single instruction stream and to operate at a second different level of power consumption when said second hybrid processing unit has control of execution of said single instruction stream.

* * * * *

UNITED STATES PATENT AND TRADEMARK OFFICE
CERTIFICATE OF CORRECTION

PATENT NO.        : 8,751,833 B2                              Page 1 of 1
APPLICATION NO.   : 12/662743
DATED             : June 10, 2014
INVENTOR(S)       : Hill It is certified that error appears in the above-identified patent and that said Letters Patent is hereby corrected as shown below:

In the Claims:

Column 33, line 15, "transmission circuit I configured" should read "transmission circuitry configured"

Signed and Sealed this
Thirtieth Day of September, 2014

Michelle K. Lee
*Deputy Director of the United States Patent and Trademark Office*